(12) United States Patent  
Wang et al.

(10) Patent No.: US 12,230,250 B2  
(45) Date of Patent: Feb. 18, 2025

(54) SPEECH RECOGNITION METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Jun Wang, Shenzhen (CN); Wing Yip Lam, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 361 days.

(21) Appl. No.: 17/671,548

(22) Filed: Feb. 14, 2022

(65) Prior Publication Data  
US 2022/0172707 A1 Jun. 2, 2022

Related U.S. Application Data

(63) Continuation of application No. PCT/CN2020/128388, filed on Nov. 12, 2020.

(30) Foreign Application Priority Data

Jan. 16, 2020 (CN) .......................... 202010047772.6

(51) Int. Cl.
*G10L 15/00* (2013.01)
*G10L 15/02* (2006.01)
(Continued)

(52) U.S. Cl.
CPC ............ *G10L 15/063* (2013.01); *G10L 15/02* (2013.01); *G10L 15/183* (2013.01); *G10L 15/22* (2013.01);
(Continued)

(58) Field of Classification Search
CPC ....... G10L 15/063; G10L 15/02; G10L 15/183; G10L 15/22; G10L 2015/025; G10L 2015/0635; G10L 15/07; G10L 15/16
See application file for complete search history.

(56) References Cited

U.S. PATENT DOCUMENTS 10,468,019 B1 11/2019 Pemba et al.
11,302,311 B2 * 4/2022 Kim ...................... G10L 15/187
(Continued)

FOREIGN PATENT DOCUMENTS

CN 103680495 A 3/2014
CN 106157953 A 11/2016
(Continued)

OTHER PUBLICATIONS

Wang ZQ, Wang D. A joint training framework for robust automatic speech recognition. IEEE/ACM Transactions on Audio, Speech, and Language Processing. Feb. 11, 2016;24(4):796-806. (Year: 2016).*

(Continued)

*Primary Examiner* — Douglas Godbold
*Assistant Examiner* — Parker Mayfield
(74) *Attorney, Agent, or Firm* — Banner & Witcoff, Ltd.

(57) ABSTRACT

A speech recognition method includes: obtaining first sample speech data corresponding to a target user and a first reference speech recognition result corresponding to the first sample speech data; obtaining a pre-update target model; inputting the first sample speech data into the pre-update target model, and performing speech recognition by using a target speech extraction model, a target feature extraction model, and a target speech recognition model, to obtain a first model output result; obtaining a target model loss value corresponding to the target feature extraction model according to the first model output result and the first reference speech recognition result; and updating a model parameter (Continued)

of the target feature extraction model in the pre-update target model according to the target model loss value, to obtain a post-update target model.

20 Claims, 11 Drawing Sheets

(51) Int. Cl.
    *G10L 15/06*           (2013.01)
    *G10L 15/183*         (2013.01)
    *G10L 15/22*           (2006.01)

(52) U.S. Cl.
    CPC ............................ *G10L 2015/025* (2013.01); *G10L 2015/0635* (2013.01)

(56) References Cited

U.S. PATENT DOCUMENTS

| | | | |
|---|---|---|---|
| 2008/0114596 A1 | 5/2008 | Acero et al. | |
| 2013/0073286 A1* | 3/2013 | Bastea-Forte | G10L 15/22 704/244 |
| 2018/0330737 A1* | 11/2018 | Paulik | G10L 17/04 |
| 2019/0325861 A1* | 10/2019 | Singh | G06N 3/044 |
| 2022/0004870 A1 | 1/2022 | Wang et al. | |

FOREIGN PATENT DOCUMENTS

| | | | | |
|---|---|---|---|---|
| CN | 108615525 A | | 10/2018 | |
| CN | 108735199 A | | 11/2018 | |
| CN | 109785824 A | | 5/2019 | |
| CN | 109801636 A | | 5/2019 | |
| CN | 110491393 A | | 11/2019 | |
| CN | 110600018 A | | 12/2019 | |
| CN | 111243576 A | | 6/2020 | |
| GB | 2546325 A | * | 7/2017 | G10L 15/063 |

OTHER PUBLICATIONS

Zhang JX, Ling ZH, Liu LJ, Jiang Y, Dai LR. Sequence-to-sequence acoustic modeling for voice conversion. IEEE/ACM Transactions on Audio, Speech, and Language Processing. Jan. 10, 2019;27(3):631-44. (Year: 2019).*
Dai D, Wu Z, Li R, Wu X, Jia J, Meng H. Learning discriminative features from spectrograms using center loss for speech emotion recognition. In ICASSP 2019-2019 IEEE International Conference on Acoustics, Speech and Signal Processing (ICASSP) May 1, 20192 (pp. 7405-7409). IEEE. (Year: 2019).*
Shi W, Shuang F. End-to-end convolutional neural network for speaker recognition based on joint supervision. In 2019 IEEE/ACIS 18th International Conference on Computer and Information Science (ICIS) Jun. 17, 2019 (pp. 385-389). IEEE. (Year: 2019).*
The State Intellectual Property Office of the People's Republic of China (SIPO) Office Action 1 for for 202010047772.6 Mar. 23, 2022 10 Pages (including translation).
The World Intellectual Property Organization (WIPO) International Search Report for PCT/CN2020/128388 Feb. 18, 2021 7 Pages (including translation).
M. L. Seltzer et al., "An investigation of deep neural networks for noise robust speech recognition," in ICASSP, IEEE, 2013, pp. 7398-7402. 5 pages.
A. Narayanan et al., "Investigation of speech separation as a front-end for noise robust speech recognition," IEEE ACM Transactions on Audio, Speech, and Language Processing, vol. 22, No. 4, pp. 826-835, 2014. 10 pages.
K. Kumatani et al., "Multi geometry spatial acoustic modeling for distant speech recognition," in 2019 IEEE International Conference on Acoustics, Speech and Signal Processing (ICASSP), IEEE, 2019. 5 pages.
Minhua Wu et al., "Frequency domain multi-channel acoustic modeling for distant speech recognition," in ICASSP, IEEE, 2019. 5 pages.
Z.-Q. Wang et al., "A joint training framework for robust automatic speech recognition," IEEE/ACM Transactions on Audio, Speech, and Language Processing, vol. 24, No. 4, pp. 796-806, 2016. 11 pages.
T. Ochiai et al., "Speaker adaptation for multichannel end-to-end speech recognition," in ICASSP, IEEE, 2018. 5 pages.
T. N. Sainath et al., "Learning filter banks within a deep neural network framework," in 2013 IEEE Workshop on Automatic Speech Recognition and Understanding, IEEE, 2013, pp. 297-302. 6 pages.
Z. Chen et al., "Deep attractor network for single-microphone speaker separation," arXiv:1611.08930v2, Mar. 28, 2017. 5 pages.
J. Wang et al., "Deep extractor network for target speaker recovery from single channel speech mixtures," in INTERSPEECH, 2018. 5 pages.
Kur Hornik et al., "Multilayer feedforward networks are universal approximators," Neural networks, vol. 2, No. 5, pp. 359-366, 1989. 8 pages.
J. Lyons, "python speech features," https://github.com/jameslyons/python_speech_features, 2013, [retrieved on Mar. 11, 2022]. 5 pages.
A. Graves et al., "Neural turing machines," arXiv preprint arXiv:1410.5401v2, Dec. 10, 2014. 26 pages.
T. N. Sainath et al., "Convolutional, long short-term memory, fully connected deep neural networks," in 2015 IEEE International Conference on Acoustics, Speech and Signal Processing (ICASSP), IEEE, 2015. 5 pages.
J. Wang et al., "Learning discriminative features in sequence training without requiring framewise labelled data," arXiv:1905.06907v1, May 16, 2019. 6 pages.
H. Liu et al., "A discriminatively learned feature embedding based on multi-loss fusion for person search," in 2018 IEEE International Conference on Acoustics, Speech and Signal Processing (ICASSP). IEEE, 2018, pp. 1668-1672. 5 pages.
M. Delcroix at al., "Auxiliary feature based adaptation of end-to-end ASR systems", Interspeech, 2018. 5 pages.
K. Vesely et al., "Sequence summarizing neural network for speaker adaptation", in Proc. Of ICASSP'16, 2016. 5 pages.
D. Yu et al., "KL-divergence regularized deep neural network adaptation for improved large vocabulary speech recognition," in Proc. Of ICASSP, 2013, pp. 7893-7897. 5 pages.
X. Li et al., "DNN online adaptation for automatic speech recognition," in Proc. Of 29th Conference on Electronic Speech Signal Processing (ESSV), 2018. 8 pages.
F. Weninger et al., "Listen, Attent, Spell and Adapt: Speaker Adapted Sequence-to-Sequence ASR," arXiv:1907.04916v1, Jul. 8, 2019. 5 pages.
Z. Meng et al., "Speaker Adaptation for Attention-Based End-to-end Speech Recognition", Interspeech 2019. 5 pages.
T. Menne et al., "Speaker Adapted Beamforming for Multi-Channel Automatic Speech Recognition," arXiv:1806.07407v1, Jun. 19, 2018. 5 pages.
WO 2019/227574 A1, Publication Date: Dec. 15, 2019, Title: "Voice model training method, voice recognition method, device and equipment, and medium" Applicant: Ping An Technology Shenzhen Co.
EP 20 913 882.5-1207, Communication Date: Dec. 12, 2024, Article 94(3) EPC Communication.

\* cited by examiner

SPEECH RECOGNITION METHOD AND APPARATUS, DEVICE, AND STORAGE MEDIUM

CROSS-REFERENCES TO RELATED APPLICATIONS

This application is a continuation application of PCT Patent Application No. PCT/CN2020/128388, entitled "SPEECH RECOGNITION METHOD AND APPARATUS, AND DEVICE AND STORAGE MEDIUM" and filed on Nov. 12, 2020, which claims priority to Chinese Patent Application No. 202010047772.6, entitled "SPEECH RECOGNITION METHOD AND APPARATUS, DEVICE, AND STORAGE MEDIUM" and filed with the National Intellectual Property Administration, PRC on Jan. 16, 2020, the entire contents of both of which are incorporated herein by reference.

FIELD OF THE TECHNOLOGY

The present disclosure relates to the field of speech processing technologies, and in particular, to a speech recognition method and apparatus, a device, and a storage medium.

BACKGROUND OF THE DISCLOSURE

With the rapid development and wide application of multimedia technologies and network technologies, there are many scenarios that require speech recognition. For example, a device may be controlled by speech. Accordingly, the device needs to recognize a user's speech to obtain a text, and then triggers a corresponding operation command based on the text to operate the device.

At present, an artificial intelligence (AI)-based speech recognition model may be used to recognize speech. However, a result obtained by using the speech recognition model often differs greatly from a correct recognition result, resulting in inadequate speech recognition.

SUMMARY

According to various embodiments provided in the present disclosure, a speech recognition method and apparatus, a device, and a storage medium are provided.

A speech recognition method is performed by a computer device, and includes: obtaining first sample speech data corresponding to a target user and a first reference speech recognition result corresponding to the first sample speech data; obtaining a pre-update target model, the pre-update target model including a target speech extraction model, a target feature extraction model, and a target speech recognition model, the target feature extraction model being bridged between the target speech extraction model and the target speech recognition model; inputting the first sample speech data into the pre-update target model, and performing speech recognition by using the target speech extraction model, the target feature extraction model, and the target speech recognition model, to obtain a first model output result; obtaining a target model loss value corresponding to the target feature extraction model according to the first model output result and the first reference speech recognition result; and updating a model parameter of the target feature extraction model in the pre-update target model according to the target model loss value, to obtain a post-update target model, and performing speech recognition on speech data of the target user by using the post-update target model.

A speech recognition apparatus includes: a module for obtaining first sample speech data, configured to obtain first sample speech data corresponding to a target user and a first reference speech recognition result corresponding to the first sample speech data; a module for obtaining a pre-update target model, configured to obtain a pre-update target model, the pre-update target model including a target speech extraction model, a target feature extraction model, and a target speech recognition model, the target feature extraction model being bridged between the target speech extraction model and the target speech recognition model; a module for obtaining a first model output result, configured to: input the first sample speech data into the pre-update target model, and perform speech recognition by using the target speech extraction model, the target feature extraction model, and the target speech recognition model, to obtain a first model output result; a module for obtaining a target model loss value, configured to obtain a target model loss value corresponding to the target feature extraction model according to the first model output result and the first reference speech recognition result; and a module for obtaining an updated target model, configured to: update a model parameter of the target feature extraction model in the pre-update target model according to the target model loss value, to obtain a post-update target model, and perform speech recognition on speech data of the target user by using the post-update target model.

A computer device includes: a memory and a processor, the memory storing computer-readable instructions. The processor is configured, when executing the computer-readable instructions, to perform: obtaining target speech data corresponding to a target user; obtaining a post-update target model, the post-update target model including a target speech extraction model, a target feature extraction model, and a target speech recognition model, the target feature extraction model being bridged between the target speech extraction model and the target speech recognition model, a model parameter of the target feature extraction model being obtained by performing update according to first sample speech data corresponding to the target user and a corresponding first reference speech recognition result; and inputting the target speech data into the post-update target model, to obtain a target speech recognition result.

One or more non-transitory storage media stores computer-readable instructions, the computer-readable instructions, when executed by one or more processors, causing the one or more processors to perform the operations of the foregoing speech recognition method.

Details of one or more embodiments of the present disclosure are provided in the accompanying drawings and descriptions below. Other features, objectives, and advantages of the present disclosure become apparent from the specification, the drawings, and the claims.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the present disclosure in detail with reference to the accompanying drawings and the embodiments. It is to be understood that the specific embodiments described herein are merely used to explain the present disclosure but are not intended to limit the present disclosure.

It may be understood that the terms "first", "second" and the like used in the present disclosure may be used for describing various elements in this specification. However, the elements are not limited by the terms unless otherwise specified. The terms are merely used for distinguishing a first element from another element. For example, without departing from the scope of the present disclosure, first sample speech data may be referred to as second sample speech data, and similarly, the second sample speech data may be referred to as the first sample speech data.

Key technologies of the speech technology include an automatic speech recognition (ASR) technology, a text-to-speech (TTS) technology, and a voiceprint recognition technology. To make a computer capable of listening, seeing, speaking, and feeling is the future development direction of human-computer interaction, and speech has become one of the most promising human-computer interaction methods in the future.

Natural language processing (NLP) is an important direction in the field of computer technologies and the field of AI. NLP studies various theories and methods for implementing effective communication between human and computers through natural languages. NLP is a science that integrates linguistics, computer science and mathematics. Therefore, studies in this field relate to natural languages, that is, languages used by people in daily life, and NLP is closely related to linguistic studies. The NLP technology generally includes technologies such as text processing, semantic understanding, machine translation, robot question and answer, and knowledge graph.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of the present disclosure relate to technologies such as speech processing of AI, which are specifically described by using the following embodiments.

Figure 1:
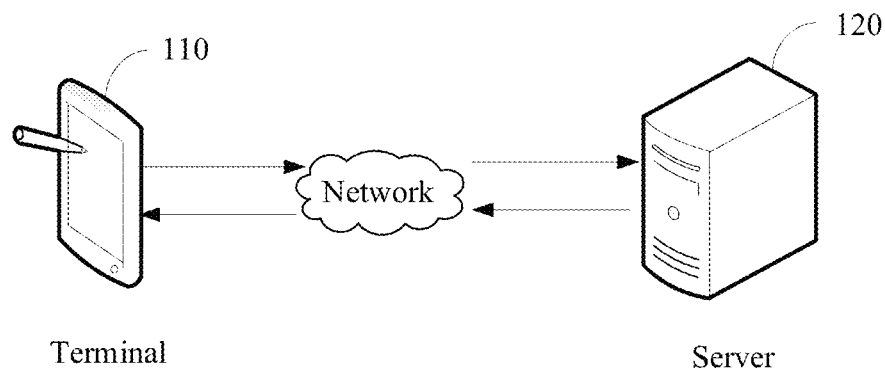
FIG. 1 is a diagram of an application environment of a speech recognition method according to an embodiment.

FIG. 1 is a diagram of an application environment of a speech recognition method in an embodiment. As shown in FIG. 1, a terminal 110 and a server 120 corresponding to a target user are included in the application environment.

The server 120 stores a pre-update target model. The pre-update target model sequentially includes a target speech extraction model, a target feature extraction model, and a target speech recognition model. The target feature extraction model is bridged between the target speech extraction model and the target speech recognition model. To implement speaker adaptive speech recognition, when detecting speech data of the target user, the terminal 110 may transmit the speech data to the server 120 as a training sample. The server 120 updates the target feature extraction model in the target model according to the speech data of the target user, to obtain a post-update target model. A parameter of the post-update target model is updated by using speech of the target user, that is, is adaptively adjusted according to a speaker. Therefore, the model better recognizes speech data of the target user. The server 120 may establish a correspondence relationship between the target user and the post-update target model. When a speech recognition result of the target user needs to be obtained, the corresponding model after update may be used for recognition. It may be understood that the target model may be deployed in the terminal 110.

The method provided in the embodiments of the present disclosure may be applied to control of a smart device or may be applied to a translation scenario. For example, after purchasing a smart home device such as a TV, a user A may control the smart home device by speech. A backend server of the smart home device stores the pre-update target model. However, because the model may be obtained by training with speech data of tens of thousands of users, that is, based on training data of non-specific people, the model lacks specificity. Every person has unique utterance positions or accent. Therefore, speaker adaptive training is further performed based on speech data of the user A, making it possible to adaptively adjust the model for the user A by training the model with a small amount of corpus of the user A.

The server 120 may be an independent physical server, or may be a server cluster constituted by a plurality of physical servers, or may be a cloud server providing basic cloud computing services, such as a cloud server, a cloud database, cloud storage and a Content Delivery Network (CDN). The terminal 110 may be a smartphone, a tablet computer, a notebook computer, a desktop computer, a smart speaker, a smartwatch, or the like, but is not limited thereto. The terminal 110 and the server 120 can be connected in a communication connection mode such as a network, which is not limited in the present disclosure.

Figure 2:
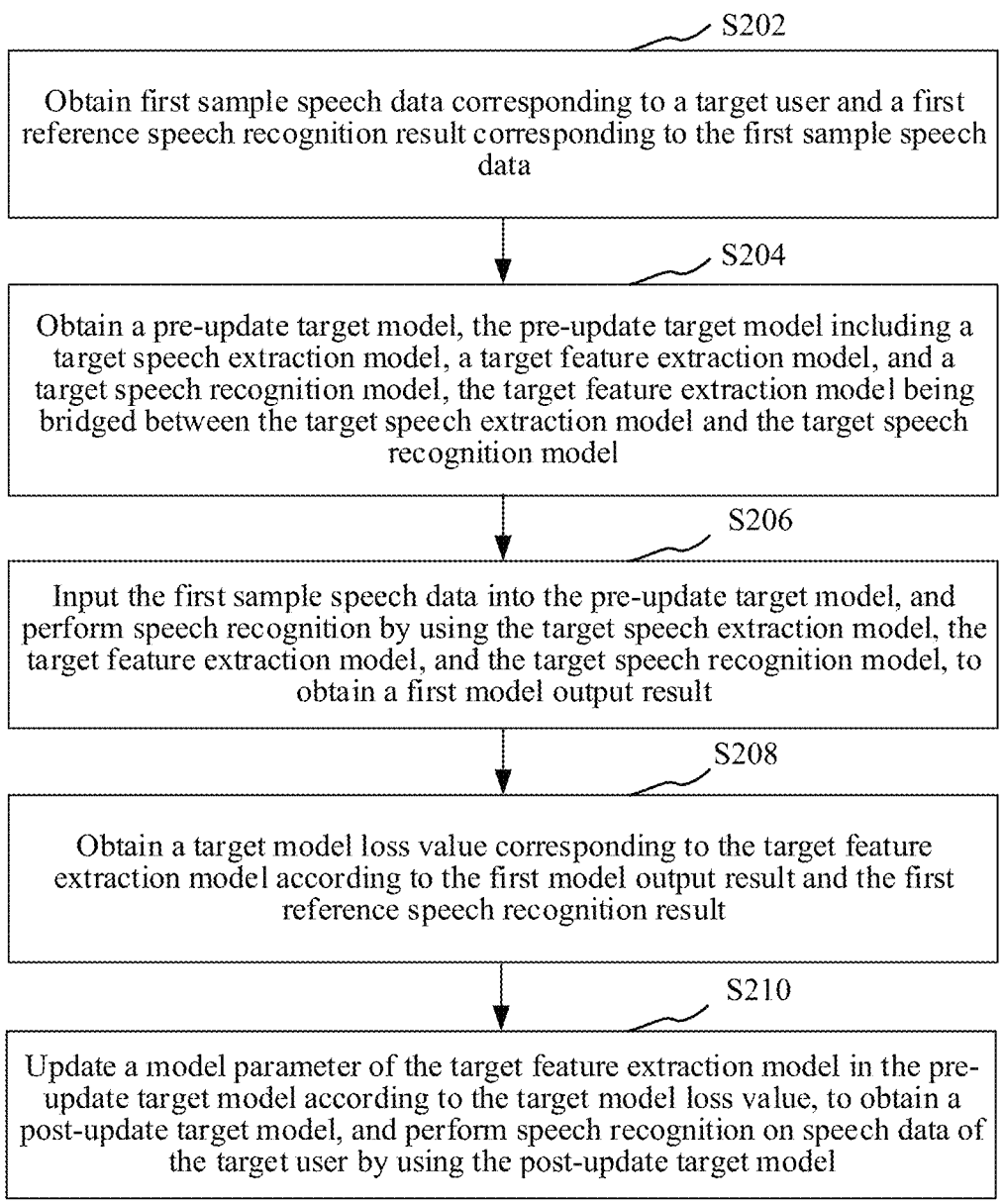
FIG. 2 is a flowchart of a speech recognition method according to an embodiment.

As shown in FIG. 2, in an embodiment, a speech recognition method is provided. It may be understood that the training of a speech recognition model discussed in the embodiments of the present disclosure refers to training of one or more models in a target model related to the implementation of speech recognition functions but does not refer to only training of a speech recognition model in the target model. This embodiment is described by using an example in which the method is applied to the server 120 in FIG. 1. Specifically, the method may include the following steps:

Step S202: Obtain first sample speech data corresponding to a target user and a first reference speech recognition result corresponding to the first sample speech data.

Specifically, the target user is any user for which speaker adaptive adjustment needs to be performed on a parameter of a model according to speech data of the user. For example, the target user may be a user that is performing an interactive task with a computer device. The interactive task may be a game. A voice call is required in the game. To better recognize speech of the user, the parameter of the model needs to be adaptively adjusted. Sample speech data means that the speech data is sample data used for model training. A reference speech recognition result corresponding to the sample speech data is a standard speech recognition result of the sample speech data, that is, may be considered as a correct recognition result. When a supervised model training method is used to perform model training, the parameter of the model is adjusted according to a predicted speech recognition result outputted by the model and the standard speech recognition result. For example, sample speech may be speech "Please enter the game", and a corresponding reference speech recognition result is a text "Please enter the game" or phonemes corresponding to the text "Please enter the game". There may be a plurality of pieces of first sample speech data. For example, a plurality of speech streams of the target user may be acquired.

In some embodiments, the execution of the model training method provided in the embodiments of the present disclosure may be triggered when a new user is triggered. That is, the new user is used as the target user. Sample speech data of the new user is obtained. A target feature extraction model in the target model is updated, to obtain a post-update target model, to recognize speech of the new user.

In some embodiments, a user transferring a preset amount of resources to a preset account may be used as the target user. The resources may be electronic money. For example, when a user A pays 30 yuan to purchase a speech recognition service, the user A is the target user.

In some embodiments, the obtaining first sample speech data corresponding to a target user and a first reference speech recognition result corresponding to the first sample speech data includes: obtaining task start speech data of the target user for triggering start of a target task as the first sample speech data corresponding to the target user; and obtaining a standard speech recognition result triggering start of the target task as the first reference speech recognition result corresponding to the first sample speech data.

Specifically, the target task may be any task. For example, the target task may be an interactive task. Interaction is behavior that occurs between two or more users that may affect each other. The user may be a person or may be a machine. The interactive task may be a game. The task may be triggered by speech. The task start speech data is speech data used for triggering start of the task. The standard speech recognition result is preset and is a speech recognition result for starting the task. When a recognition result of speech is consistent with the speech recognition result, the task may be started. The standard speech recognition result is data in a text form. When needing to start a task by sound, the target user usually needs to produce speech data according to a related instruction such as an instruction in a device manual to start the task. Speech data for triggering start of a task is usually relatively simple, and specific speech data is usually required to start the task. Therefore, if the speech data of the target user can start the target task, it indicates that there is a very small difference between a speech recognition result of the target user and the standard speech recognition result. It is only when a machine can recognize that the user intends to start the task. Therefore, the preset standard speech recognition result may be used as the first reference speech recognition result. In this embodiment of the present disclosure, a standard speech recognition result triggering start of the target task is used as a reference speech recognition result of the task start speech data, so that during speaker adaptive training, an accurate reference speech recognition result is automatically obtained without needing to manually label a reference recognition result of speech data, thereby improving the efficiency of model training.

In some embodiments, when there are a plurality of pieces of speech for the task start speech data and there are a plurality of standard speech recognition results, the standard speech recognition results may correspond one to one to the pieces of speech according to an arrangement order of the standard speech recognition results and a speech receiving order.

In an actual example, for a game xx, standard speech for entering the game xx is usually "Enter game xx", and when prompt information "Please confirm entry" is produced, the user needs to utter speech "Confirm entry" to enter the game xx. Therefore, if a terminal of the user eventually enters the game xx, it indicates that a recognition result of speech of the user is consistent with or slightly different from a standard recognition result. Therefore, if the arrangement order of the standard speech recognition results is sequentially a text "Enter game xx" and a text "Confirm entry", the text "Enter game xx" may be used as a reference recognition result of the first piece of speech of the user, and the text "Confirm entry" is used as a reference speech recognition result of the second piece of speech of the user.

In some embodiments, the speech data may be acquired by one or more microphones. "A plurality of" refers to at least two.

In some embodiments, the task start speech data of the target user may be obtained in a process of starting the interactive task to update the model, so that after the target user enters the interactive task, speech of the target user may be recognized in time by using the model after update, thereby improving the accuracy of a speech recognition task, to better recognize speech of the user.

Step S204: Obtain a pre-update target model, the pre-update target model including a target speech extraction model, a target feature extraction model, and a target speech recognition model, the target feature extraction model being bridged between the target speech extraction model and the target speech recognition model.

Specifically, the speech extraction model is configured to extract speech to obtain valid speech data. For example, the speech extraction model may have at least one of a Speech Enhancement (SE) function or a Speech Separation (SS) function. The SS is to extract the speech data of the target user from speech data of a plurality of users. The SE is to extract a useful speech signal from various noise to suppress noise. According to a quantity of microphones, the speech extraction model includes a single-channel speech extraction model and a multi-channel speech extraction model. The single-channel speech extraction model is configured to extract speech data acquired by a single microphone. The multi-channel speech extraction model is configured to extract speech data acquired by a plurality of microphones. The speech extraction is a user-oriented speech processing task with the objective of obtaining valid speech data of the target user.

The target feature extraction model is configured to extract features of the speech data of the target user. After speech extraction of the speech extraction model, valid speech data of the target user is obtained. However, because there may be partial distortion, features may be extracted using a feature extraction model, thereby reducing the impact of speech distortion on the recognition effect of the speech recognition model. The speech recognition model may be an ASR model. An acoustic model configured to perform speech recognition may obtain a speech recognition result according to an output of the speech recognition model. The speech recognition result may be a speech recognition result in a text form. That is, the speech recognition model may output a text. For example, assuming that speech data inputted by a user is "Walk to the right", a speech recognition result may be "Walk to the right". The speech recognition model may be obtained through learning and training using a sample speech stream as training data. Phonemes may be obtained through recognition of the speech recognition model. A speech recognition result may be obtained by combining the phonemes. Therefore, the performance of the speech recognition model may be measured by using at least one of a Word Error Rate (WER), a Character Error Rate (CER) or a Sentence Error Rate (SER). A phoneme is a speech unit obtained through division according to natural attributes of speech. Different pronunciation phonemes may be obtained through division for different languages. For example, Mandarin Chinese may include 22 consonants and 10 vowels. The International Phonetic Alphabet for English has a total of 48 phonemes, including 20 vowel phonemes and 28 consonant phonemes.

Figure 3:
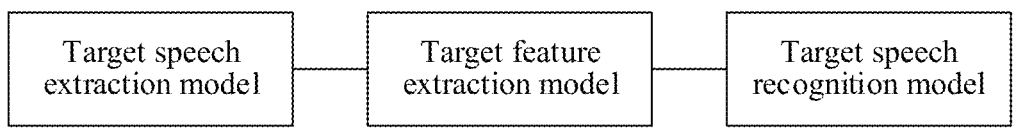
FIG. 3 is an architectural diagram of a target model according to an embodiment.

Bridging means that one object is located between at least two objects and connects the at least two objects. That is, for an object B, if the object is bridged between A and C, it indicates that the object B is located between A and C, one end of B is connected to A, and the other end of B is connected to C. For a model, if the target feature extraction model is bridged between the target speech extraction model and the target speech recognition model, it indicates that an output of the target speech extraction model is an input of the target feature extraction model. Data outputted after the target feature extraction model processes inputted data is an input of the target speech recognition model. That is, when the target feature extraction model is bridged between the target speech extraction model and the target speech recognition model, it indicates that the target speech extraction model is in front, followed by the target speech recognition model. The target speech extraction model, the target feature extraction model, and the target speech recognition model may be obtained through pretraining, and may be obtained through joint training or may be obtained through separate training. Alternatively, each model may be separately trained first, and the models are then trained jointly. FIG. 3 is an architectural diagram of a target model provided in some embodiments. Model types of the target speech extraction model, the target feature extraction model, and the target speech recognition model may be set as required. For example, the target model may be a neural network model, for example, at least one of a Convolutional Neural Network (CNN) model, a Deep Neural Network (DNN) model or a Recurrent Neural Network (RNN) model. The RNN model may be, for example, a Long Short-Term Memory Neural Network (LSTM) model or a Bi-directional Long Short-Term Memory (BiLSTM) neural network model.

In some embodiments, the target speech recognition model includes an encoding model and a decoding model. The encoding model is configured to perform feature encoding to obtain an encoded feature representing a semantic meaning. The decoding model is configured to decode the encoded feature to obtain a speech recognition result. One piece of sample speech may include a plurality of training audio frames. An encoded feature of one training audio frame and an encoded feature of an audio frame in a context window may be spliced and then inputted into the decoding model. For example, the context window has a size of 2W+1 frames. Therefore, an encoded feature reflecting context information can be obtained, thereby improving the accuracy of a speech recognition network model.

Step S206: Input the first sample speech data into the pre-update target model, and perform speech recognition by using the target speech extraction model, the target feature extraction model, and the target speech recognition model, to obtain a first model output result.

Specifically, a model output result is a result outputted by the target model. The speech recognition result may include, for example, a probability of a state corresponding to a phoneme. One phoneme may be formed by a plurality of states, for example, three states. A target state may be obtained according to a probability of a state. A phoneme may be obtained according to a target state. A word may be obtained according to a phoneme. A sentence obtained by combining words is an eventual speech recognition result. For example, the model output result may be a probability outputted by an activation function layer of the speech recognition model. After obtaining the first sample speech data, the server inputs the first sample speech data into the pre-update target model. The first sample speech data is sequentially processed by the target speech extraction model, the target feature extraction model, and the target speech recognition model, so that the first model output result may be outputted. For example, the target speech extraction model may perform speech extraction on the first sample speech data. The target feature extraction model performs feature extraction on extracted speech. The target speech recognition model obtains the first model output result according to an extracted feature.

Step S208: Obtain a target model loss value corresponding to the target feature extraction model according to the first model output result and the first reference speech recognition result.

Specifically, the target model loss value is obtained according to the first model output result and the first reference speech recognition result. For example, the first model output result may include a probability distribution corresponding to phonemes outputted by the model. A probability distribution corresponding to phonemes corresponding to the first reference speech recognition result may be obtained. A loss value is obtained based on a difference between the probability distributions. The difference between the probability distributions is positively correlated to the loss value. When the difference is larger, the loss value is larger. For example, the target model loss value may be calculated using a cross entropy loss function. Certainly, the target model loss value may be calculated using another loss function. For example, the target model loss value may be obtained by combining a model loss value corresponding to the target speech extraction model. The loss value may be obtained according to a loss function. The first model output result is a result outputted by the target speech recognition model. Therefore, the server may calculate the loss value of the target speech recognition model according to the difference between the probability distributions corresponding to the first model output result and the first reference speech recognition result. In the method provided in the embodiments of the present disclosure, for the intermediate target feature extraction model, the server obtains a target loss value corresponding to the target feature extraction model according to a final speech recognition loss corresponding to the target speech recognition model. Therefore, the parameter of the target feature extraction model may be adjusted in the direction of improving speech recognition capability, so that the adjusted parameter of the feature extraction model is more accurate.

Step S210: Update a model parameter of the target feature extraction model in the pre-update target model according to the target model loss value, to obtain a post-update target model, and perform speech recognition on speech data of the target user by using the post-update target model.

Specifically, after the model loss value is obtained, the server may adjust the model parameter of the target feature extraction model according to a gradient descent method in the direction of reducing the loss value, and keep parameters of the target speech extraction model and the target speech recognition model unchanged, to obtain the post-update target model. For example, a formula for updating the model parameter of the target feature extraction model may be represented by $\Theta_{SPK} = \Theta_{SPK} - \beta \partial \Theta_{SPK} / \partial L$, and $\Theta_{SPK}$ represents a model parameter of a model for performing adaptive update for a speaker, and is a model parameter of a feature extraction model in this embodiment of the present disclosure. L represents the target model loss value, and $\beta$ represents a hyperparameter for controlling a learning rate.

After obtaining the post-update target model, the server may perform speech recognition on speech data of the target user by using the post-update target model. It may be understood that the training of a model may be iterative and repeated. That is, the post-update target model may be obtained through iterative training. The training stops when a model convergence condition is satisfied. The model convergence condition may include at least one of the model loss value being less than a first threshold, a change value in the model loss value being less than a first change value or a change in a model parameter being less than a second change value. For example, the model convergence condition may be a change in the model loss value being less than a preset loss value change, or may be a change in a model parameter being less than a preset parameter change value. For example, when the target user corresponds to a plurality of pieces of first sample speech data, training may be performed a plurality of times, and each time the plurality of pieces of first sample speech data are used to perform model training.

In some embodiments, reverse gradient update is performed on the model parameter of the target feature extraction model according to the target model loss value starting from the last layer of the target feature extraction model, and parameter update is stopped until update reaches the first layer of the target feature extraction model, to obtain the post-update target model.

Specifically, "reverse" refers to that the direction of parameter update is opposite to that of processing speech data. Because parameter update involves backpropagation, the server may obtain a descent gradient according to the target model loss value. Gradient update of the model parameter starts to be performed according to the descent gradient starting from the last layer of the target feature extraction mode, and update is stopped until the first layer of the target feature extraction model is reached. In this way, in a process of speaker adaptive training, during update of the target model, only the intermediate feature extraction model is updated, thereby resolving the problem of modular decoupling. In this way, a speaker adaptive model method may be not limited to any specific front-end speech extraction model architecture or back-end acoustic model architecture. That is, when the front-end speech extraction model or back-end acoustic model architecture needs to be changed, the intermediate speaker adaptive feature extraction model is not affected, so that advanced front-end speech extraction model and ASR acoustic model architectures or technologies can be flexibly introduced in the target model.

For example, assuming that the architecture of the ASR model, that is, the target speech recognition model, needs to be changed, due to the change in the model architecture, the ASR model needs to be retrained. If speaker adaptation is performed using the ASR model, a training sample for the retrained ASR model is a training sample of a nonspecific person. Therefore, if a speech recognition system requires speaker adaptation, speech data of each user further needs to be obtained, and the ASR model is trained for each user, leading to a high training cost. An intermediate model, that is, the feature extraction model, is introduced between the ASR model and the speech extraction model, and speaker adaptation is performed using the intermediate model, that is, a parameter of the intermediate model is adaptively changed according to a speaker. In this case, even if the ASR model is retrained, the parameter of the intermediate model is not affected. Therefore, the retrained ASR model is spliced after feature extraction models that separately correspond to users, so that adaptive target models corresponding to the users can be obtained, so that the target model can have a speaker adaptation capability without needing to perform adaptive training on the model again for each speaker.

By the foregoing speech recognition method and apparatus, computer device, and storage medium, a feature extraction model is deployed between a front-end speech extraction model and a rear-end speech recognition model, so that valid speech data can be extracted using the speech extraction model, thereby reducing noise, and speech features can be extracted using the feature extraction model, thereby reducing the impact caused by distortion in speech extraction. In addition, the parameter of the feature extraction model is updated using the speech data of a target user, so that while the capability of adaptive recognition according to a speaker of the trained target model is improved, that is, the speech recognition effect for the target user is improved, the complexity of speaker adaptive training can be reduced.

Figure 4:
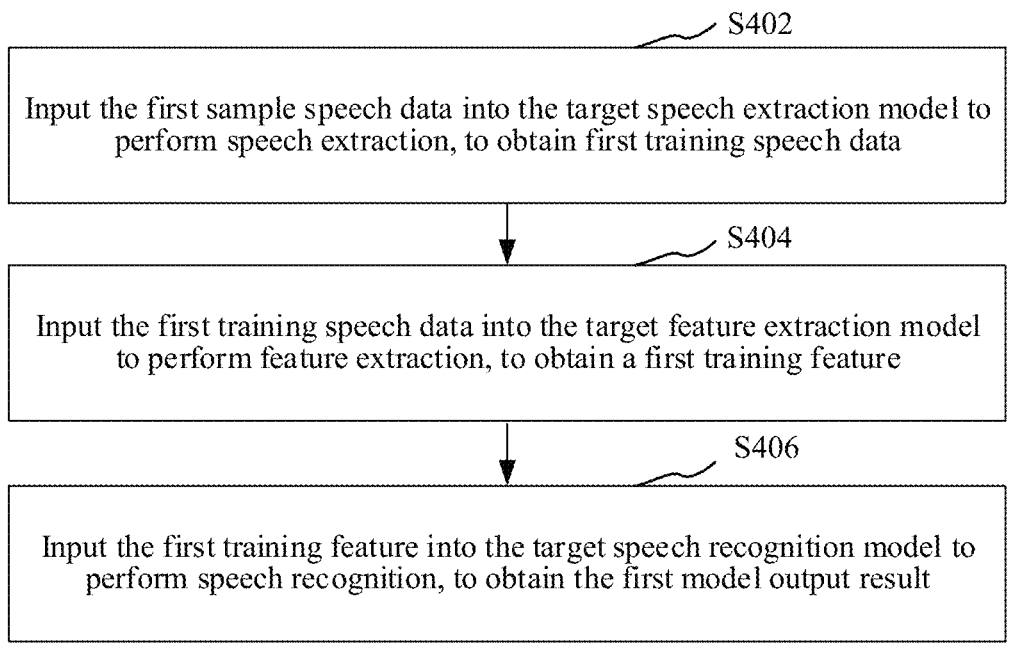
FIG. 4 is a flowchart of performing speech recognition by using a target speech extraction model, a target feature extraction model, and a target speech recognition model, to obtain a first model output result according to an embodiment.

In some embodiments, as shown in FIG. 4, the performing speech recognition by using the target speech extraction model, the target feature extraction model, and the target speech recognition model, to obtain a first model output result includes the following steps:

Step S402: Input the first sample speech data into the target speech extraction model to perform speech extraction, to obtain first training speech data.

Specifically, the first training speech data is extracted by the target speech extraction model, thereby reducing the impact of noise on speech corresponding to the target user. During speech extraction, the server may segment a speech stream acquired by a speech acquisition device such as a microphone to obtain spectra that separately correspond to a plurality of audio frames, and input the spectra into the speech extraction model to extract the corresponding spectra. A length of an audio frame may be a preset length, for example, 25 milliseconds. The target speech extraction model may be a Deep Attractor Net (DANet) including an Ideal Ratio Mask (IRM) and a Deep Extractor Net (DENet). The DENet includes one or more neural networks. The neural network may use a BiLSTM network. The BiLSTM network is configured to map a speech signal from a low-dimensional space into a high-dimensional space. The DANet is configured to embed an attractor in a high-dimensional space to combine time-frequency information in the speech signal for training. One piece of speech data may include a plurality of audio frames. Therefore, the speech extraction model may obtain a plurality of spectra.

In an embodiment, the model architecture of the target speech extraction model may be set as required. For example, the target speech extraction model may be obtained by cascading a BiLSTM model and one fully connected layer. A quantity of network layers of the BiLSTM model may be set as required, for example, set to 4. The network layers may use a peephole connection. The peephole connection is a model connection member that is distinguished from conventional cascading, and may obtain more context information. For example, there are 600 hidden nodes in each layer of the target speech extraction model. One fully connected layer is connected to the last BiLSTM layer. The fully connected layer is configured to map a 600-dimensional speech feature vector into a high-dimensional feature embedding matrix, for example, a 24000-dimensional feature embedding matrix.

Step S404: Input the first training speech data into the target feature extraction model to perform feature extraction, to obtain a first training feature.

Specifically, the target feature extraction model performs feature extraction on training speech data to obtain features corresponding to the spectra, that is, first training features. The model architecture of the target feature extraction model may be set as required. For example, speech data may include a plurality of audio frames. To combine the context of a spectral graph to predict an output feature, a BiLSTM or deep convolutional neural network may be used.

In some embodiments, the target feature extraction model may have BiLSTM network layers. The network layers may use a peephole connection. For example, the second neural network model may use two layers of BiLSTM with a peephole connection. There are 600 hidden nodes in each layer. A 40-dimensional feature vector may be obtained through mapping.

In some embodiments, the server may input a masked spectral graph (that is, the first training speech data) into a BiLSTM layer of the target feature extraction model. The BiLSTM layer processes the spectral graph to obtain an intermediate feature. Because the intermediate feature outputted by the BiLSTM layer may be a negative number, and a speech feature is usually non-negative, for example, Fbanks outputted by a Mel filter is non-negative, to meet the conventional definition of a feature, non-negative processing may be performed on the intermediate feature, for example, the feature may be squared, to obtain a non-negative feature. The non-negative feature may be used as the first training feature. To improve the accuracy of features, the non-negative features may be differentiated. The differentiation is an operation manner that may simulate human ear operation, so that a process of the feature extraction better conforms to a process of processing speech data by human ears. The differentiation may include at least one of element-wise logarithm calculation, first-order difference calculation or second-order difference calculation.

In some embodiments, a global mean variance of the differentiated feature may further be normalized. A method used for normalization may be a normalization method such as Z-score standardization.

Step S406: Input the first training feature into the target speech recognition model to perform speech recognition, to obtain the first model output result.

Specifically, the server may input first training features corresponding to the audio frames into the target speech recognition model. The target speech recognition model obtains a probability of a phoneme state corresponding to the first sample speech data. The phoneme state is a state of a constituent phoneme.

In some embodiments, a first training feature corresponding to a current audio frame may be spliced with a first training feature of an audio frame in a context window of the audio frame, and the spliced feature is inputted into the target speech recognition model, so that a speech recognition result of the feature combines semantic information of the content, thereby improving the accuracy of the speech recognition result. For example, training features of audio frames in a context window of 2W+1 frames with the current audio frame being the center are spliced. W represents a size of a single side of the context window. A specific size may be flexibly set as required, for example, may be set to 6.

Figure 5:
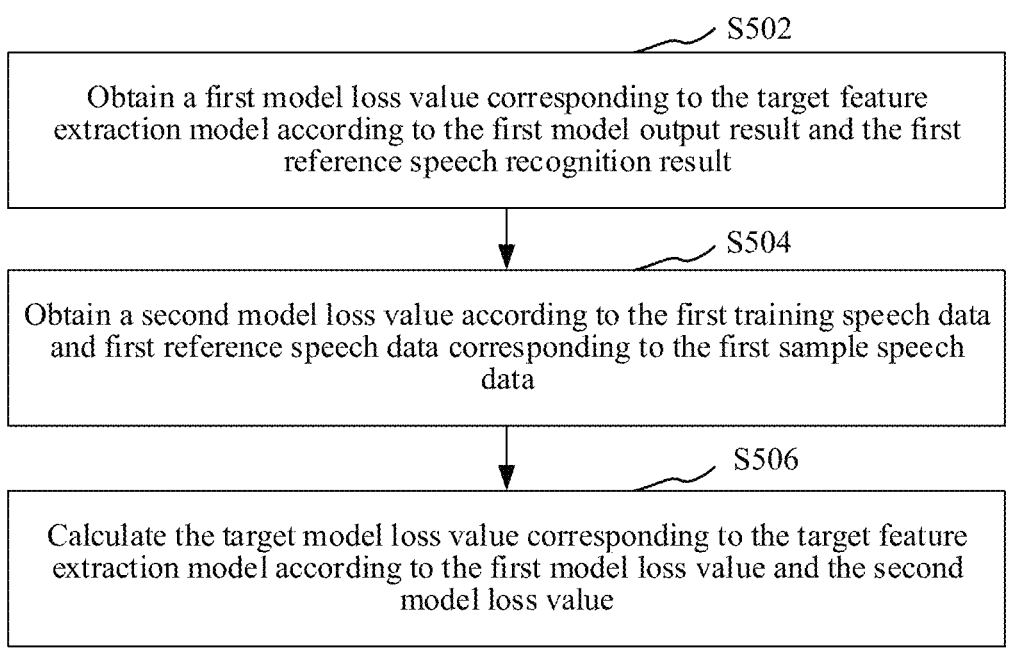
FIG. 5 is a flowchart of obtaining a target model loss value corresponding to a target feature extraction model according to a first model output result and a first reference speech recognition result according to an embodiment.

In some embodiments, as shown in FIG. 5, the obtaining a target model loss value corresponding to the target feature extraction model according to the first model output result and the first reference speech recognition result includes the following steps:

Step S502: Obtain a first model loss value corresponding to the target feature extraction model according to the first model output result and the first reference speech recognition result.

Specifically, the server may calculate the first model loss value using a cross entropy loss function. The cross entropy loss function is shown by Formula (1), where $L_{ce}$ is a cross entropy loss value, M is a batch size of a sample speech stream for training, and T is a frame quantity of audio frames in the sample speech stream. $Y_t^{(K_i)}$ represents a probability corresponding to a reference speech recognition result, $\hat{Y}_t^{(K_i)}$ is an output (a probability) for an $i^{th}$ node after a softmax layer of the target speech recognition model, and there are K output nodes in the target speech recognition model, representing K output categories.

$$L_{ce} = \frac{1}{MT}\sum_{t=1}^{M}\sum_{t=1}^{T} -Y_t^{(K_i)}\log\hat{Y}_t^{(K_i)}. \tag{1}$$

The first model loss value may be obtained in combination with a center loss value. The center loss value is obtained according to a difference between an encoded feature corresponding to an audio frame of audio data and a phoneme class center vector, and may be represented by Formula (2). $L_\alpha$ represents the center loss value; $u_t^{(i)}$ is an encoded feature of a $t^{th}$ audio frame, and is an output of an encoder of the target speech recognition model at a moment of the $t^{th}$ audio frame; and $c_{Kt}^{(i)}$ represents a center vector of an encoded feature of a $Kt^{th}$ class, and i is an index of the sample speech stream. The center loss value is calculated by using the formula, so that the target feature extraction model may be adjusted in the direction of reducing a distance between an encoded feature corresponding to an audio frame and a center vector of the encoded feature, to obtain a small difference between encoded features corresponding to the same phoneme class, thereby improving the accuracy of decoding.

$$L_{ct} = \sum_t \|u_t^{(i)} - c_{Kt}^{(i)}\|_2^2. \quad (2)$$

The server may obtain the first model loss value according to the loss value obtained using the cross entropy loss function and the center loss value, for example, may perform weighted summation on the loss value obtained using the cross entropy loss function and the center loss value to obtain the first model loss value. Weights of weighting may be set as required. Formula (3) is used for representation, where $L_{CL}$ represents the first model loss value, and $\lambda_{CL}$ is a coefficient for controlling a weight of the center loss value in the first model loss value. The coefficient may be set as required, for example, set to 0.01.

$$L_{CL} = L_{ce} + \lambda_{CL} L_{ct} \quad (3).$$

Step S504: Obtain a second model loss value according to the first training speech data and first reference speech data corresponding to the first sample speech data.

Specifically, the first reference speech data corresponding to the first sample speech data is standard reference speech data, for example, is speech data corresponding to the target user recorded in a clean environment with little noise. The first training speech data and the first sample speech data may exist in a spectral form. The second model loss value may be obtained according to the difference between the first training speech data and the first reference speech data. The difference is positively correlated to the second model loss value. For example, a Mean Squared Error (MSE) between the first training speech data and the first reference speech data may be calculated as the second model loss value. A formula of calculating the second model loss value may be represented by Formula (4). M is a batch size of a sample speech stream for training, i represents an index of a training sample speech stream, $\|.\|_2$ represents a 2-norm of a vector, $S_S$ represents a predicted spectrum outputted by the target speech extraction model, and $\hat{S}_S$ represents a reference spectrum of a sample speech stream.

$$L_{MSE} = \frac{1}{M} \sum_{i=1}^{M} \|S_S^{(i)} - \hat{S}_S^{(i)}\|_2^2. \quad (4)$$

Step S506: Calculate the target model loss value corresponding to the target feature extraction model according to the first model loss value and the second model loss value.

Specifically, the target model loss value is obtained according to the first model loss value and the second model loss value, for example, may be obtained by performing weighted summation.

In some embodiments, weighted summation is performed according to the first model loss value and a corresponding first weight and the second model loss value and a corresponding second weight, to obtain the target model loss value corresponding to the target feature extraction model.

Specifically, the first weight and the second weight may be set as required. For example, the first weight may be 1, and the second weight may be 2. The first model loss value may be multiplied by the first weight to obtain a, the second model loss value is multiplied by the second weight to obtain b, and a and b are added to obtain the target model loss value. In this embodiment of the present disclosure, the target model loss value is obtained according to the first model loss value and the second model loss value. The first model loss value is obtained according to the first model output result and the first reference speech recognition result, and therefore may be used for representing the model loss of the target speech recognition model. The second model loss value is obtained according to the first training speech data and the first reference speech data corresponding to the first sample speech data, and therefore may be used for representing the model loss of the target speech extraction model. Therefore, the two loss values are combined to obtain the model loss of the target feature extraction model, so that the target feature extraction model may take losses of both models into consideration to adjust a model parameter, and the model parameter obtained through learning may coordinate a difference between the target speech extraction model and the target speech recognition model, thereby improving the speech recognition effect of the entire target model.

In some embodiments, the models of the pre-update target model may be obtained through joint training. Steps of the joint training may include: obtaining second sample speech data corresponding to a training user and a second reference speech recognition result corresponding to the second sample speech data, to form a training sample; and performing joint training on a first speech extraction model, a first feature extraction model, and a first speech recognition model according to the training sample, to obtain the pre-update target model, the model parameter being updated according to a joint loss value during training, the joint loss value being determined according to a model loss value corresponding to the first speech extraction model and a model loss value corresponding to the first speech recognition model.

Specifically, a plurality of training users, for example, tens of thousands of training users, may be used. The training user may be not a specific user, that is, a non-specific person. Therefore, the pre-update target model obtained through training is a Speaker Independent (SI) speech recognition model corresponding to the non-specific person. The joint training refers to that a plurality of models are combined for training, and may be an end-to-end training process. The first speech extraction model is a speech extraction model before the joint training. The first feature extraction model is a feature extraction model before the joint training. The first speech recognition model is a speech recognition model before the joint training. The joint loss value is a model loss value calculated during joint training. The joint loss value being determined according to a model loss value corresponding to the first speech extraction model and a model loss value corresponding to the first speech recognition model. For example, the joint loss value may be obtained by performing weighted summation on the model loss value corresponding to the first speech extraction model and the model loss value corresponding to the first speech recognition model. The model loss value corresponding to the first speech extraction model may be obtained according to a difference between a predicted output and an actual result of the speech extraction model. For example, the model loss value corresponding to the first speech extraction model may be obtained with reference to Formula (4), and only different sample speech streams inputted during training. The model loss value corresponding to the first speech recognition model is obtained according to a difference between a predicted output and an actual output of the speech recognition model, for example, may be obtained with reference to Formula (3), and only different data is inputted during training.

In some embodiments, after the joint loss value is obtained, model parameters of the first speech extraction model, the first feature extraction model, and the first speech recognition model are adjusted in the direction of reducing the joint loss value, the adjusted first speech extraction model is used as the target speech extraction model, the adjusted first feature extraction model is used as the target feature extraction model, and the adjusted first speech recognition model is used as the target speech recognition model, to form the pre-update target model. When the target model requires speaker adaptation, the sample speech data of a target speaker, that is, the target user, may be obtained, and the feature extraction model in the target model is updated, to obtain the target model with a parameter adaptively updated for the target user.

In some embodiments, a formula for backpropagation of a parameter according to the joint loss value may be represented by Formula (5), where ∂L represents the joint loss value, and may be $L_{CL}+\lambda_{SS}L_{MSE}$, that is, may be calculated by using the same loss function for calculating the target model loss value. $\Theta_{EAR}$ represents the target model, $\Theta_{extract}$ represents a model parameter of the speech extraction model, $\Theta_{adapt}$ represents a model parameter of the feature extraction model, $\Theta_{recog}$ represents a model parameter of the speech recognition model, and α represents a hyperparameter for controlling a learning rate. For example, a formula for backpropagation of a model parameter of the target speech extraction model according to the joint loss value may be shown in Formula (6). $\Theta_{extract}$ represents the model parameter of the speech extraction model, $\hat{F}_{adapt}$ represents a model parameter other than BiLSTM in the feature extraction model, and $\hat{F}$ represents a model parameter of BiLSTM in the feature extraction model. $\hat{M}_S$ represents a masked matrix in the speech extraction model, and V represents a feature embedding matrix in the speech extraction model. $\lambda_{SS}$ is a weighting vector, used for adjusting the "importance" of the model loss value corresponding to the speech extraction model during joint training.

$$\Theta_{EAR} = \Theta_{EAR} - \alpha\left\{\frac{\partial L}{\partial \Theta_{extract}}, \frac{L_{CL}}{\partial \Theta_{adapt}}, \frac{L_{CL}}{\partial \Theta_{recog}}\right\}, \text{ and} \quad (5)$$

$$\frac{\partial L}{\partial \Theta_{extract}} = \frac{\partial (L_{CL}+\lambda_{SS}L_{MSE})}{\partial \hat{F}_{adapt}} \frac{\partial \hat{F}_{adapt}}{\partial \hat{F}} \frac{\partial \hat{F}}{\partial \hat{M}_s} \frac{\partial \hat{M}_s}{\partial V} \frac{\partial V}{\partial \Theta_{extract}}. \quad (6)$$

In this embodiment of the present disclosure, during joint training, the joint loss value is determined according to the model loss value corresponding to the first speech extraction model and the model loss value corresponding to the first speech recognition model. Therefore, both the model loss of the speech extraction model and the model loss of the speech recognition model may be taken into consideration for model training. Therefore, training may be performed without sacrificing the performance of any single model, and a difference between a speech extraction task and a speech recognition task is coordinated, so that the accuracy of the obtained target model is higher. In addition, each model in the target model may comprehensively learn interference features in speech signals from a complex acoustic environment, so that the global performance of a speech processing task can be ensured, thereby improving the accuracy of speech recognition. In addition, because each model in a network architecture supports flexible and independent selection, optimal configuration may be implemented for each single model without needing to sacrifice any single model, so that the global performance of each speech processing task can be ensured, thereby improving the objective intelligibility of speech. In this embodiment of the present disclosure, during joint training, a parameter of the feature extraction model is adjusted according to the joint loss value, so that a feature extracted using the trained feature extraction model has robustness. That is, the feature extraction model provided in this embodiment of the present disclosure may be an intermediate transitional robust representation model. Therefore, even if speech recognition is performed in different environments or for different users, stable and reliable features representing speech characteristics of a user can be extracted, thereby improving the accuracy of speech recognition.

In some embodiments, before the first speech extraction model, the first feature extraction model, and the first speech recognition model are jointly trained, at least one of the speech extraction model, the feature extraction model or the speech recognition model may be separately trained, thereby reducing a quantity of times of joint training, and improving the efficiency of joint training. For example, the speech extraction model may be first trained using sample speech for training a user, to obtain the first speech extraction model. Model training is then performed on the speech recognition model using sample speech for training a user, to obtain the first speech recognition model. After the first speech extraction model and the first speech recognition model are obtained, an initial feature extraction model is obtained. The first speech extraction model, the initial feature extraction model, and the first speech recognition model are sequentially combined, to train the model again. During model training, only a model parameter of the initial feature extraction model in the combined model may be updated, and parameters of the first speech extraction model and the first speech recognition model are updated, that is, model parameters of the first speech extraction model and the first speech recognition model are frozen, so that the first feature extraction model can be quickly obtained through training.

During the separate training of the speech extraction model using the sample speech for training a user, the model loss value of the speech extraction model may be calculated according to Formula (4). During the training of the initial feature extraction model using the sample speech for training a user, the model loss value of the initial feature extraction model may be calculated according to Formula (3). That is, a formula of backpropagation corresponding to the initial feature extraction model may be shown in Formula (7).

$$\frac{\partial L_{CL}}{\partial \Theta_{adapt}} = \frac{\partial L_{CL}}{\partial \hat{F}_{adapt}} \frac{\partial \hat{F}_{adapt}}{\partial \hat{F}} \frac{\partial \hat{F}}{\partial \Theta_{adapt}}. \quad (7)$$

During the separate training of the speech recognition model using the sample speech for training a user, the model loss value of the speech recognition model may be calculated according to Formula (3).

Figure 6:
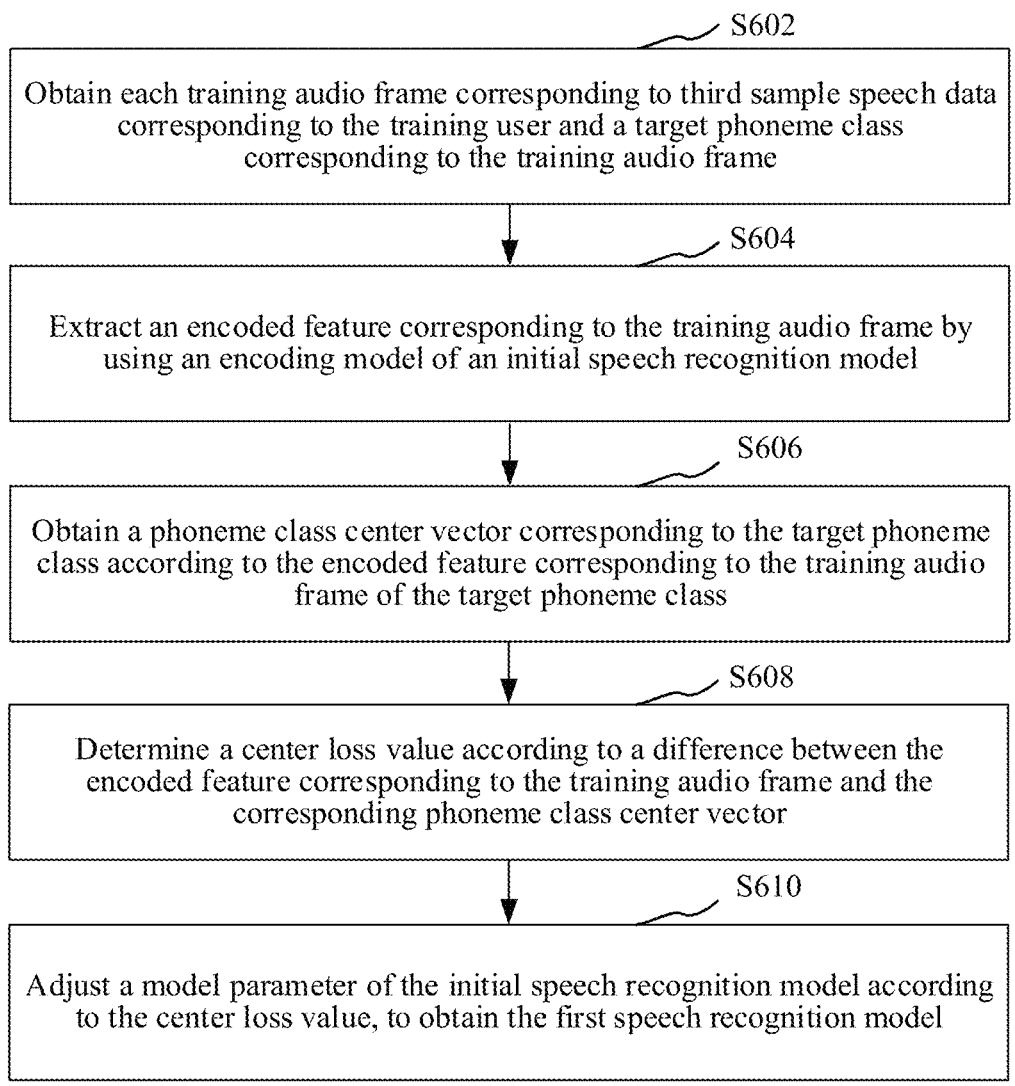
FIG. 6 is a flowchart of steps of obtaining a first speech recognition model according to an embodiment.

In some embodiments, as shown in FIG. 6, operations of obtaining the first speech recognition model include:

Step S602: Obtain each training audio frame corresponding to third sample speech data corresponding to the training user and a target phoneme class corresponding to the training audio frame.

Specifically, the server may segment the third sample speech data according to a preset time length, to obtain a plurality of audio frames. For example, the preset time length may be 15 ms. Target phoneme classes corresponding to the training audio frames are labeled in advance or may be automatically labeled. Phoneme classes may be divided as required. For example, Mandarin may have 12 thousand classes.

Step S604: Extract an encoded feature corresponding to the training audio frame by using an encoding model of an initial speech recognition model.

Specifically, the speech recognition model may include an encoder and a decoder. The encoder maps an input into a deep feature space. Therefore, the encoded feature corresponding to the training audio frame may be extracted by using the encoding model of the initial speech recognition model. The speech recognition model may be a CLDNN-based acoustic model. CLDNN is a model including a CNN, LSTM, and a DNN. Outputs of a CNN layer and an LSTM layer may be normalized in batches, to implement faster convergence and better generalization. An output of the speech recognition model may be a context-related phoneme.

Step S606: Obtain a phoneme class center vector corresponding to the target phoneme class according to the encoded feature corresponding to the training audio frame of the target phoneme class.

Specifically, the phoneme class center vector is used for representing a center of all encoded features corresponding to one target phoneme class, and may be represented using a cluster center.

Step S608: Determine a center loss value according to a difference between the encoded feature corresponding to the training audio frame and the corresponding phoneme class center vector.

Specifically, the center loss value may be obtained according to the difference between the encoded feature and the phoneme class center vector, and for example, may be obtained with reference to Formula (2). When the difference is larger, the center loss value is larger. Therefore, a difference between encoded features of the same phoneme class may be measured by using the center loss value, and a distance between an encoded feature and a center point of a class corresponding to the encoded feature is penalized, so that a distinguishing capability of the encoded feature can be improved, thereby improving the accuracy of speech recognition of the speech recognition model.

Step S610: Adjust a model parameter of the initial speech recognition model according to the center loss value, to obtain the first speech recognition model.

Specifically, the server may adjust the model parameter of the initial speech recognition model in the direction of reducing the center loss value, so that a plurality of times of iterative training may be performed, to obtain the first speech recognition model.

In some embodiments, the server may combine the loss value calculated using the cross entropy loss function and the center loss value to obtain the loss value of the speech recognition model. For example, the loss value corresponding to the initial speech recognition model may be calculated according to Formula (3). The method provided in this embodiment of the present disclosure may be applied to a speech extraction model based on a single channel. It is found through experiments that in a complex environment, even if speech data is acquired using one microphone, an adequate speech recognition effect can be obtained through speech recognition using the target model. A speech processing task is divided into two fully independent models: a speech extraction model and a speech recognition model, and one of the speech extraction model and the speech recognition model is selected for speaker adaptation. In this case, after the speaker adaptation, if the speech extraction model or the speech recognition model needs to be updated, a speaker adaptive model training step needs to be performed again. By the model structure and a speaker adaptive model training method provided in the embodiments of the present disclosure, speaker adaptive training is performed on the target feature extraction model bridged between the target speech extraction model and the target speech recognition model, so that when the speech extraction model or the speech recognition model needs to be updated, speaker adaptation is not affected, the problem of modular decoupling of the models can be resolved, and the speech extraction model and the target speech recognition model may be updated as required at any time, thereby achieving high flexibility. In addition, a front-end speech extraction model and a rear-end speech recognition model are connected by an intermediate robust representation model (a feature extraction model), so that the entire target model becomes one network capable of end-to-end backpropagation, and because of the modular architecture, the network of the entire model may use a "curriculum" training method. For example, the front-end speech extraction model and the rear-end speech recognition model are first separately pre-trained, joint training is then performed on the entire model end to end, and finally speaker adaptation is performed on the feature extraction model in the model. Compared with a disadvantage that end-to-end joint training of other networks of the same complexity does not converge easily, the "curriculum" training method provided in the embodiments of the present disclosure makes the training of the entire network easy to converge. The gradient descent method provided in the embodiments of the present disclosure may be a small-batch random gradient descent method.

Figure 7:
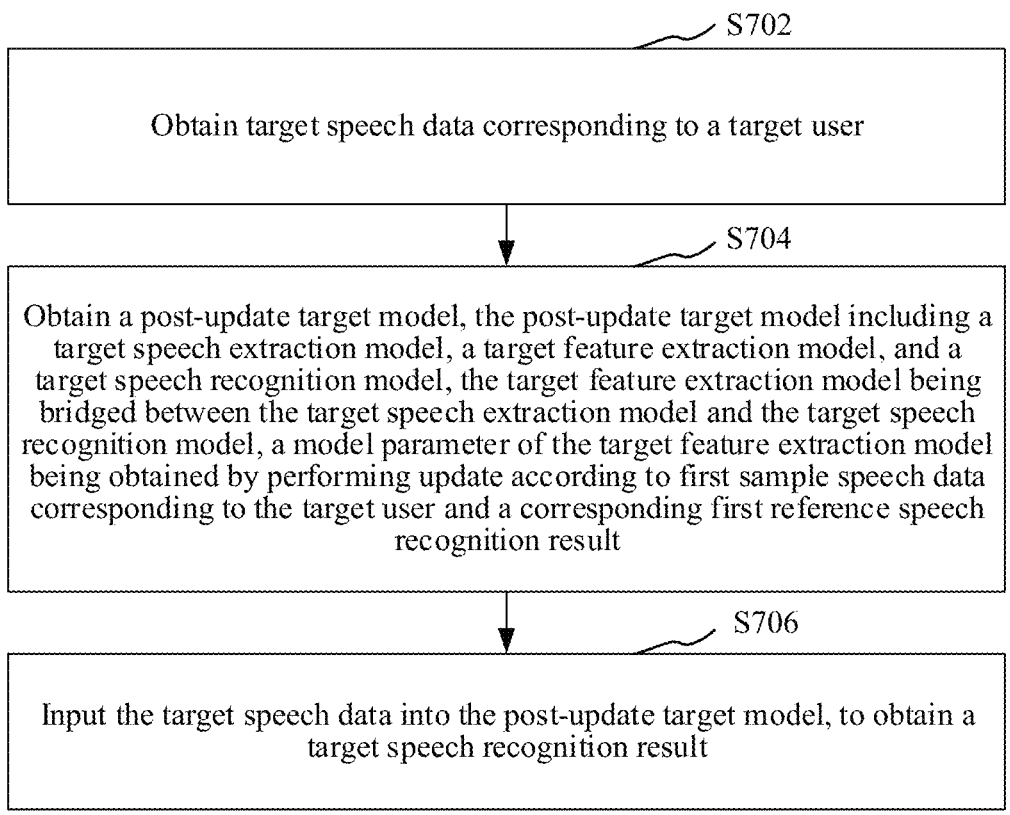
FIG. 7 is a flowchart of a speech recognition method according to an embodiment.

As shown in FIG. 7, in an embodiment, a speech recognition method is provided. This embodiment is described by using an example in which the method is applied to the server 120 in FIG. 1. Specifically, the method may include the following steps:

Step S702: Obtain target speech data corresponding to a target user.

Specifically, after the server obtains a post-update target model, because the post-update target model is a model adapted based on a speaker, that is, the target user, when speech recognition needs to be performed on the target user, the target speech data corresponding to the target user may be obtained.

Step S704: Obtain a post-update target model, the post-update target model including a target speech extraction model, a target feature extraction model, and a target speech recognition model, the target feature extraction model being bridged between the target speech extraction model and the target speech recognition model, a model parameter of the target feature extraction model being obtained by performing update according to first sample speech data corresponding to the target user and a corresponding first reference speech recognition result.

Specifically, a correspondence relationship between the target user and the speaker adaptive target model is established, and therefore the post-update target model corresponding to the target user may be obtained. The post-update target model is obtained through training using the model training method provided in this embodiment of the present disclosure.

Step S706: Input the target speech data into the post-update target model, to obtain a target speech recognition result.

Specifically, the speech recognition result may be a speech recognition result in a text form. After the speech recognition result is obtained, the speech recognition result is displayed on a terminal, or a control instruction may be transmitted based on the speech recognition result. For example, assuming that the speech recognition result is "Walk forward", a game character controlled by the target user in a game may be controlled to walk forward.

By the foregoing speech recognition method, a feature extraction model is deployed between a front-end speech extraction model and a rear-end speech recognition model, so that valid speech data can be extracted using the speech extraction model, thereby reducing noise, and speech features can be extracted using the feature extraction model, thereby reducing the impact caused by distortion in speech extraction. In addition, a parameter of the feature extraction model is updated using the speech data of the target user, so that while the capability of adaptive recognition according to a speaker of the trained target model is improved, that is, the speech recognition effect for the target user is improved, the complexity of adaptive training can be reduced.

In some embodiments, specifically, the speech recognition method may further include the following steps: obtaining a receiving user corresponding to the target speech data; obtaining extracted speech data obtained by performing extraction on the target speech data by the target speech extraction model; and transmitting the extracted speech data and the target speech recognition result to a terminal corresponding to the receiving user, so that the terminal plays the extracted speech data and displays the target speech recognition result.

Specifically, the target speech data is transmitted by the target user to the receiving user, the extracted speech data is speech data extracted using the target speech extraction model, and therefore noise in the target speech data may be filtered out. The extracted speech data and the target speech recognition result may be transmitted together to the terminal corresponding to the receiving user, or may be transmitted sequentially. After the terminal corresponding to the receiving user receives the extracted speech data and the target speech recognition result, the extracted speech data may be played and the speech recognition result may be displayed, so that the receiving user may determine as required whether to listen to the audio data or view the speech recognition result.

By the method provided in this embodiment of the present disclosure, speech extraction is performed on the target speech data using the target speech extraction model, so that noise in the target speech data can be reduced, thereby improving the quality of voice call. In addition, the speech recognition result is displayed, so that a user may understand the meaning expressed in the speech data from the speech recognition result, thereby achieving high efficiency of speech communication. In an actual example, assuming that a team is formed during gaming and voice call is required in a game scenario, generally, there are both near-end speakers and background sound played by mobile phones during gaming, resulting in relatively low call quality. The speech extraction model provided in this embodiment of the present disclosure may extract speech with noise removed, thereby improving call quality, and the speech recognition result is displayed on a voice call interface, so that the user may rely on a text obtained through speech recognition to understand the meaning expressed in speech.

Figure 8:
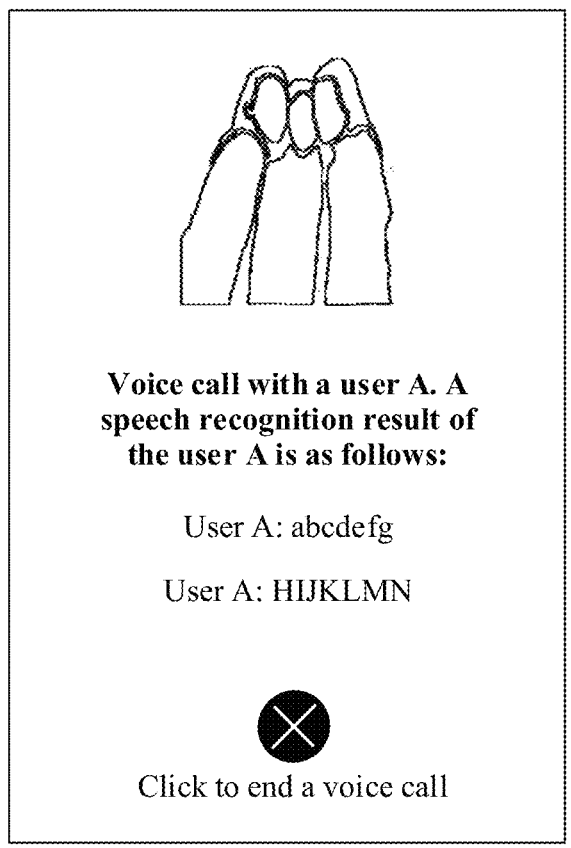
FIG. 8 is a schematic diagram of a voice call interface according to an embodiment.

In some embodiments, the target user and the receiving user may be users making a voice call. FIG. 8 is a schematic diagram of a voice call interface in some embodiments. During the voice call, as the voice call takes place, the speech recognition result displayed in the voice call interface may be updated following changes in speech data in the voice call.

In some embodiments, the method provided in this embodiment of the present disclosure may specifically include the following steps:

1. Train an initial speech recognition model to obtain a first speech recognition model.

Specifically, speech data corresponding to any user, that is, a non-specific person, and a corresponding reference speech recognition result may be obtained, to train the initial speech recognition model to obtain the first speech recognition model.

2. Train an initial speech extraction model to obtain a first speech extraction model.

Specifically, speech data corresponding to any user and a corresponding reference speech extraction result may be obtained, to train the initial speech extraction model to obtain the first speech extraction model. It may be understood that Step 1 and Step 2 may be performed synchronously.

Figure 9A:
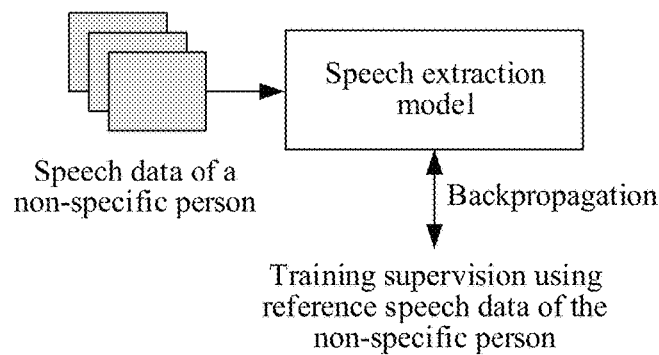
FIG. 9A is a schematic diagram of training a speech extraction model according to an embodiment.

As shown in FIG. 9A, speech data with noise of a non-specific person may be obtained, clean speech data with noise removed corresponding to the speech data is used as reference speech data to train the speech extraction model, and backpropagation of the parameter is performed based on the supervision of the reference speech data, to train the speech extraction model.

3. Sequentially splice the first speech extraction model, the initial feature extraction model, and the first speech extraction model in an order, and train the initial feature extraction model based on the spliced model to obtain the first feature extraction model.

Specifically, parameters of the first speech extraction model and the first speech extraction model may be frozen, training speech data corresponding to a training user, corresponding clean reference speech data, and a corresponding reference text are obtained, and the initial feature extraction model in the spliced model is trained to obtain the first feature extraction model.

4. Perform joint training on the first speech extraction model, the first feature extraction model, and the first speech recognition model according to the training sample, to obtain the pre-update target model.

Figure 9B:
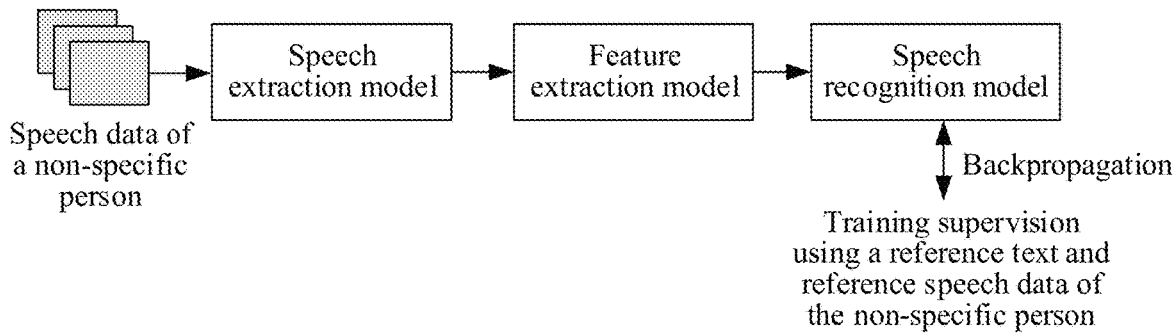
FIG. 9B is a schematic diagram of training a joint speech extraction model, a feature extraction model, and a speech recognition model according to an embodiment.

For example, as shown in FIG. 9B, the training speech data of the training user may be inputted into the speech extraction model. The training data may be speech data of a non-specific person. The speech data of a non-specific person refers to that the speech data has no designated user. After the training speech data is processed by the speech extraction model, extracted speech extraction data is outputted, and a model loss value in the speech extraction model is calculated according to the supervision of the reference speech data of the non-specific person. After the extracted speech extraction data is processed by the feature extraction model and the speech recognition model, a speech recognition text is outputted, the model loss value in the speech recognition model is calculated based on the supervision of the reference text of a non-specific person, a joint loss value is obtained based on weighting of the model loss value in the speech extraction model and the model loss value in the speech recognition model, and model parameters of models in the initial model are reversely updated based on the joint loss value to obtain the pre-update target model.

5. Obtain a target user, and obtain first sample speech data corresponding to the target user and a first reference speech recognition result corresponding to the first sample speech data.

Specifically, a user that requires speaker adaptation may be obtained as the target user, and sample speech data of the target user and the first reference speech recognition result are obtained.

6. Input the first sample speech data into the pre-update target model, and perform speech recognition by using the target speech extraction model, the target feature extraction model, and the target speech recognition model, to obtain a first model output result.

7. Obtain a target model loss value corresponding to the target feature extraction model according to the first model output result and the first reference speech recognition result.

Figure 9C:
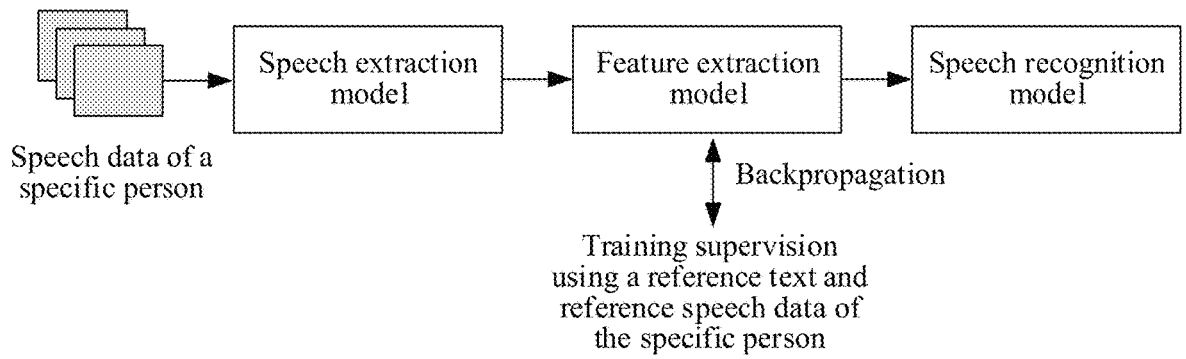
FIG. 9C is a schematic diagram of performing speaker adaptive training on a feature extraction model according to an embodiment.

Specifically, as shown in FIG. 9C, adaptive speech data of the target user (that is, a specific person) may be inputted into the speech extraction model. After the training speech data is processed by the speech extraction model, extracted speech extraction data is outputted, and the model loss value in the speech extraction model is calculated according to the supervision of clean reference speech data of the target user.

After the extracted speech extraction data is processed by the feature extraction model and the speech recognition model, a speech recognition text is outputted, the model loss value in the speech recognition model is calculated based on the supervision of a standard reference text of a specific person, that is, the target user, the target model loss value corresponding to the feature extraction model is obtained based on weighting of the model loss value in the speech extraction model and the model loss value in the speech recognition model, and model parameters of the speech extraction model and the speech recognition model are frozen. Only a model parameter of the target feature extraction model in the pre-update target model is updated based on the target model loss value, to obtain a target speech model after update. That is, speaker adaptation is performed only on the model parameter of the feature extraction model.

8. Perform speech recognition on speech data of the target user by using a post-update target model.

In some embodiments of the present disclosure, for the speech recognition model, the speech extraction model, and the feature extraction model obtained through training in different phases, different names are added before the names of the models. For example, the speech recognition model includes an initial speech recognition model, a first speech recognition model, and a target speech recognition model. It may be understood that these names are used for distinguishing between different training phases. However, the same name may be used in different training phases. A person skilled in the art may understand that during training, for the same model, the parameter of the model may be updated continuously.

In an embodiment, for speech from two acoustic environments "with interference of background music" and "with interference from other speakers", in five different signal-to-noise ratios (SNR) conditions (0 dB, 5 dB, 10 dB, 15 dB, and 20 dB), WERs based on different speech recognition methods are tested and compared. For test results, reference may be made to the following Table 1. As shown in the following Table 1, speech recognition is performed based on an EAR model provided in the embodiments of the present disclosure, WERs in both a single task state $\lambda_{SS}=0$ and a multi-task state $\lambda_{SS}\neq 0$ (for example, $\lambda_{SS}=0.1$) are both better than WERs in other speech recognition systems, for example, a cascaded system of a speech recognition model ASR, a speech extraction model SS, and a speech recognition model ASR trained based on clean speech or speech with interference. The EAR model is a system without speaker adaptation provided in this embodiment of the present disclosure, that is, the pre-update target model.

TABLE 1

WERs in recognition of speech from two acoustic environments based on different speech recognition methods in five SNR conditions

| Speech recognition method | SNR with interference from background music | | | | | SNR with interference from other speakers | | | | |
|---|---|---|---|---|---|---|---|---|---|---|
| | 0 dB | 5 dB | 10 dB | 15 dB | 20 dB | 0 dB | 5 dB | 10 dB | 15 dB | 20 dB |
| ASR (Clean speech) | 92.9 | 85.2 | 72.2 | 56.3 | 42.0 | 99.5 | 87.7 | 69.8 | 51.0 | 36.7 |
| ASR (speech with interference) | 60.0 | 40.7 | 30.4 | 24.2 | 20.3 | 82.2 | 57.7 | 33.8 | 22.7 | 18.8 |
| SS + ASR cascading | 56.3 | 44.8 | 36.9 | 32.0 | 29.0 | 86.4 | 61.4 | 40.6 | 32.1 | 28.4 |
| EAR ($\lambda_{SS}=0$) | 43.0 | 33.8 | 28.5 | 23.3 | 19.9 | 75.4 | 48.2 | 24.6 | 14.1 | 12.0 |
| EAR ($\lambda_{SS}=0.1$) | 25.7 | 18.3 | 14.7 | 13.0 | 12.2 | 63.6 | 39.9 | 18.8 | 11.7 | 10.9 |

Figure 10:
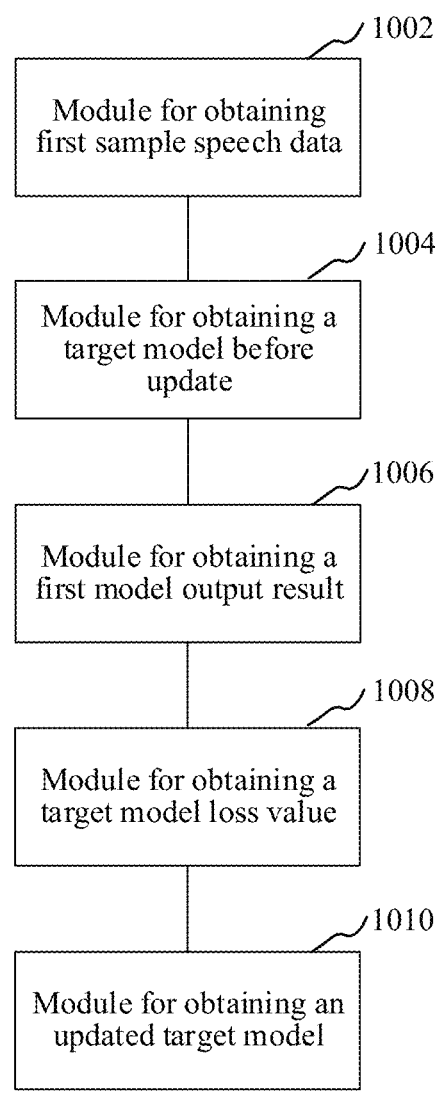
FIG. 10 is a structural block diagram of a speech recognition apparatus according to an embodiment.

As shown in FIG. 10, in an embodiment, a speech recognition apparatus is provided. The speech recognition apparatus may be integrated in the foregoing server 120, and may specifically include a module 1002 for obtaining first sample speech data, a module 1004 for obtaining a pre-update target model, a module 1006 for obtaining a first model output result, a module 1008 for obtaining a target model loss value, and a module 1010 for obtaining an updated target model.

The module 1002 for obtaining first sample speech data is configured to obtain first sample speech data corresponding to a target user and a first reference speech recognition result corresponding to the first sample speech data.

The module 1004 for obtaining a pre-update target model is configured to obtain a pre-update target model, the pre-update target model including a target speech extraction model, a target feature extraction model, and a target speech recognition model, the target feature extraction model being bridged between the target speech extraction model and the target speech recognition model.

The module 1006 for obtaining a first model output result is configured to: input the first sample speech data into the pre-update target model, and perform speech recognition by using the target speech extraction model, the target feature extraction model, and the target speech recognition model, to obtain a first model output result.

The module 1008 for obtaining a target model loss value is configured to obtain a target model loss value corresponding to the target feature extraction model according to the first model output result and the first reference speech recognition result.

The module 1010 for obtaining an updated target model is configured to: update a model parameter of the target feature extraction model in the pre-update target model according to the target model loss value, to obtain a post-update target model, and perform speech recognition on speech data of the target user by using the post-update target model.

In some embodiments, the module 1006 for obtaining a first model output result is configured to: input the first sample speech data into the target speech extraction model to perform speech extraction, to obtain first training speech data; input the first training speech data into the target feature extraction model to perform feature extraction, to obtain a first training feature; and input the first training feature into the target speech recognition model to perform speech recognition, to obtain the first model output result.

In some embodiments, the module 1008 for obtaining a target model loss value is configured to: obtain a first model loss value corresponding to the target feature extraction model according to the first model output result and the first reference speech recognition result; obtain a second model loss value according to the first training speech data and first reference speech data corresponding to the first sample speech data; and calculate the target model loss value corresponding to the target feature extraction model according to the first model loss value and the second model loss value.

In some embodiments, the module 1008 for obtaining a target model loss value is configured to: perform weighted summation according to the first model loss value and a corresponding first weight and the second model loss value and a corresponding second weight, to obtain the target model loss value corresponding to the target feature extraction model.

In some embodiments, the module 1004 for obtaining a pre-update target model is configured to: obtain second sample speech data corresponding to a training user and a second reference speech recognition result corresponding to the second sample speech data, to form a training sample; and perform joint training on a first speech extraction model, a first feature extraction model, and a first speech recognition model according to the training sample, to obtain the pre-update target model, the model parameter being updated according to a joint loss value during training, the joint loss value being determined according to a model loss value corresponding to the first speech extraction model and a model loss value corresponding to the first speech recognition model.

In some embodiments, a module for obtaining a first speech recognition model is configured to: obtain each training audio frame corresponding to third sample speech data corresponding to the training user and a target phoneme class corresponding to the training audio frame; extract an encoded feature corresponding to the training audio frame by using an encoding model of an initial speech recognition model; obtain a phoneme class center vector corresponding to the target phoneme class according to the encoded feature corresponding to the training audio frame of the target phoneme class; determine a center loss value according to a difference between the encoded feature corresponding to the training audio frame and the corresponding phoneme class center vector; and adjust a model parameter of the initial speech recognition model according to the center loss value, to obtain the first speech recognition model.

In some embodiments, the module 1010 for obtaining an updated target model is configured to: perform reverse gradient update on the model parameter of the target feature extraction model according to the target model loss value starting from the last layer of the target feature extraction model, and stop parameter update until update reaches the first layer of the target feature extraction model, to obtain the post-update target model.

In some embodiments, the module for obtaining first sample speech data is configured to: obtain task start speech data of the target user for triggering start of a target task as the first sample speech data corresponding to the target user; and obtain a standard speech recognition result triggering start of the target task as the first reference speech recognition result corresponding to the first sample speech data.

Figure 11:
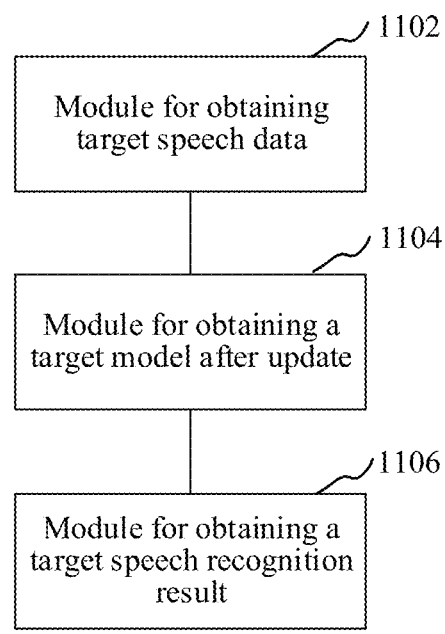
FIG. 11 is a structural block diagram of a speech recognition apparatus according to an embodiment.

As shown in FIG. 11, in an embodiment, a speech recognition apparatus is provided. The speech recognition apparatus may be integrated in the foregoing server 120, and may specifically include a module for obtaining target speech data 1102, a module 1104 for obtaining a post-update target model, and a module 1106 for obtaining a target speech recognition result.

The module 1102 for obtaining target speech data is configured to obtain target speech data corresponding to a target user.

The module 1104 for obtaining a post-update target model is configured to obtain a post-update target model, the post-update target model including a target speech extraction model, a target feature extraction model, and a target speech recognition model, the target feature extraction model being bridged between the target speech extraction model and the target speech recognition model, a model parameter of the target feature extraction model being obtained by performing update according to first sample speech data corresponding to the target user and a corresponding first reference speech recognition result.

The module 1106 for obtaining a target speech recognition result is configured to input the target speech data into the post-update target model, to obtain a target speech recognition result.

In some embodiments, the speech recognition apparatus further includes: a module for obtaining a receiving user, configured to obtain a receiving user corresponding to the target speech data; a module for obtaining extracted speech data, configured to obtain extracted speech data obtained by performing extraction on the target speech data by the target speech extraction model; and a transmission module, configured to transmit the extracted speech data and the target speech recognition result to a terminal corresponding to the receiving user, so that the terminal plays the extracted speech data and displays the target speech recognition result.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 12:
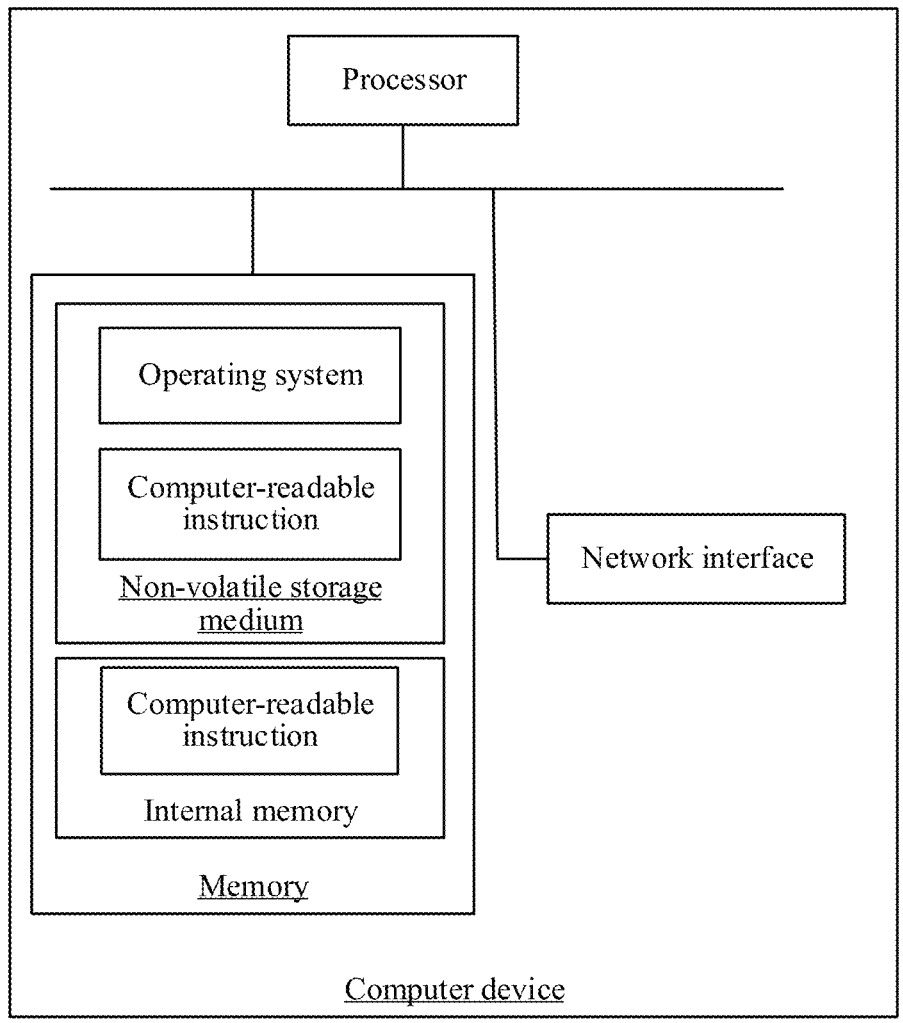
FIG. 12 is a block diagram of the internal structure of a computer device according to an embodiment.

FIG. 12 is a diagram of the internal structure of a computer device according to an embodiment. The computer device may be specifically the server 120 in FIG. 1. As shown in FIG. 12, the computer device includes a processor, a memory, and a network interface that are connected through a system bus. The memory includes a non-volatile storage medium and an internal memory. The non-volatile storage medium of the computer device stores an operating system, and may further store computer-readable instructions. The computer-readable instructions, when executed by the processor, may cause the processor to implement the speech recognition method. The internal memory may also store a computer-readable instruction, and when the computer-readable instruction is executed by the processor, the processor may be caused to perform the speech recognition method.

A person skilled in the art may understand that, the structure shown in FIG. 12 is only a block diagram of a part of a structure related to a solution of the present disclosure and does not limit the computer device to which the solution of the present disclosure is applied. Specifically, the computer device may include more or fewer components than those in the drawings, or some components are combined, or a different component deployment is used.

In an embodiment, the speech recognition apparatus provided in the present disclosure may be implemented in a form of computer-readable instructions, and the computer-readable instructions may run on the computer device shown in FIG. 12. The memory of the computer device may store program modules that form the speech recognition apparatus, for example, the module 1002 for obtaining first sample speech data, the module 1004 for obtaining a pre-update target model, the module 1006 for obtaining a first model output result, the module 1008 for obtaining a target model loss value, and the module 1010 for obtaining an updated target model shown in FIG. 10. The computer-readable instructions formed by the program modules causes the processor to perform the steps in the speech recognition method in the embodiments of the present disclosure described in this specification.

In an embodiment, a computer device is provided, including: a memory and a processor. The memory stores computer-readable instructions, the computer-readable instructions, when executed by the processor, causing the processor to perform the steps in the foregoing speech recognition method. The steps of the speech recognition method may be the steps of the speech recognition method in the foregoing embodiments.

In an embodiment, a non-transitory computer-readable storage medium is provided. The computer-readable storage medium stores computer-readable instructions, the computer-readable instructions, when executed by the processor, causing the processor to perform the steps in the foregoing speech recognition method. The steps of the speech recognition method may be the steps of the speech recognition method in the foregoing embodiments.

In an embodiment, a computer program product or a computer program is provided. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the steps in the method embodiments.

It is to be understood that although the steps in the flowcharts of the embodiments of the present disclosure are displayed in sequence according to arrows, the steps are not necessarily performed in the sequence indicated by the arrows. Unless otherwise explicitly specified in the present disclosure, execution of the steps is not strictly limited, and the steps may be performed in other sequences. In addition, at least some of the steps in the foregoing embodiments may include a plurality of substeps or a plurality of stages. These substeps or stages are not necessarily completed at the same moment, but may be performed at different moments. Besides, these substeps or stages may not be necessarily performed sequentially, but may be performed in turn or alternately with other steps or at least some of substeps or stages of other steps.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. References to the memory, the storage, the database, or other medium used in the embodiments provided in the present disclosure may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a RAM or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), a Rambus direct RAM (RDRAM), a direct rambus dynamic RAM (DRDRAM), and a rambus dynamic RAM (RDRAM).

The technical features in the foregoing embodiments may be combined in different manners to form other embodiments. For concise description, not all possible combinations of the technical features in the embodiments are described. However, provided that combinations of the technical features do not conflict with each other, the combinations of the technical features are considered as falling within the scope described in this specification.

The foregoing embodiments show only several implementations of the present disclosure and are described in detail, which, however, are not to be construed as a limitation to the patent scope of the present disclosure. For a person of ordinary skill in the art, several transformations and improvements can be made without departing from the idea of the present disclosure. These transformations and improvements belong to the protection scope of the present disclosure. Therefore, the protection scope of the patent of the present disclosure shall be subject to the appended claims.

What is claimed is:

1. A speech recognition method, performed by a computer device, and comprising:
obtaining first sample speech data corresponding to a target user and a first reference speech recognition result corresponding to the first sample speech data;
obtaining a pre-update target model, the pre-update target model comprising a target speech extraction model, a target feature extraction model, and a target speech recognition model, wherein the target feature extraction model bridges the target speech extraction model and the target speech recognition model, wherein the target speech recognition model is trained using a plurality of training audio frames each corresponding to a respective target phoneme class, and wherein at least one model parameter, of the target speech recognition model, is adjusted based on a center loss value that indicates a difference between an encoded feature, of a first training audio frame corresponding to a first target phoneme class, and a phoneme class center vector corresponding to the first target phoneme class;
inputting the first sample speech data into the pre-update target model, and performing speech recognition by using the target speech extraction model, the target feature extraction model, and the target speech recognition model, to obtain a first model output result;
obtaining a target model loss value corresponding to the target feature extraction model according to the first model output result and the first reference speech recognition result; and
updating a model parameter of the target feature extraction model in the pre-update target model according to the target model loss value, to obtain a post-update target model, and performing speech recognition on speech data of the target user by using the post-update target model.

2. The method according to claim 1, wherein the performing speech recognition by using the target speech extraction model, the target feature extraction model, and the target speech recognition model, to obtain a first model output result comprises:
inputting the first sample speech data into the target speech extraction model to perform speech extraction, to obtain first training speech data;
inputting the first training speech data into the target feature extraction model to perform feature extraction, to obtain a first training feature; and
inputting the first training feature into the target speech recognition model to perform speech recognition, to obtain the first model output result.

3. The method according to claim 2, wherein the obtaining a target model loss value corresponding to the target feature extraction model according to the first model output result and the first reference speech recognition result comprises:
obtaining a first model loss value corresponding to the target feature extraction model according to the first model output result and the first reference speech recognition result;
obtaining a second model loss value according to the first training speech data and first reference speech data corresponding to the first sample speech data; and
calculating the target model loss value corresponding to the target feature extraction model according to the first model loss value and the second model loss value.

4. The method according to claim 3, wherein the calculating the target model loss value corresponding to the target feature extraction model according to the first model loss value and the second model loss value comprises:
performing weighted summation according to the first model loss value and a corresponding first weight and the second model loss value and a corresponding second weight, to obtain the target model loss value corresponding to the target feature extraction model.

5. The method according to claim 1, wherein obtaining the pre-update target model comprises:
obtaining second sample speech data corresponding to a training user and a second reference speech recognition result corresponding to the second sample speech data, to form a training sample; and
performing joint training on a first speech extraction model, a first feature extraction model, and a first speech recognition model according to the training sample, to obtain the pre-update target model, the model parameter being updated according to a joint loss value during training, the joint loss value being determined according to a model loss value corresponding to the first speech extraction model and a model loss value corresponding to the first speech recognition model.

6. The method according to claim 5, wherein obtaining the first speech recognition model comprises:
obtaining the plurality of training audio frames; and
for each of the plurality of training audio frames:
extracting an encoded feature corresponding to the training audio frame by using an encoding model of an initial speech recognition model;
obtaining a phoneme class center vector corresponding to the target phoneme class according to the encoded feature corresponding to the training audio frame of the target phoneme class;
determining a center loss value according to a difference between the encoded feature corresponding to the training audio frame and the corresponding phoneme class center vector; and
adjusting a model parameter of the initial speech recognition model according to the center loss value.

7. The method according to claim 1, wherein the updating a model parameter of the target feature extraction model in the pre-update target model according to the target model loss value, to obtain a post-update target model comprises:
performing reverse gradient update on the model parameter of the target feature extraction model according to the target model loss value starting from the last layer of the target feature extraction model, and stopping parameter update until update reaches the first layer of the target feature extraction model, to obtain the post-update target model.

8. The method according to claim 1, wherein the obtaining first sample speech data corresponding to a target user and a first reference speech recognition result corresponding to the first sample speech data comprises:
obtaining task start speech data of the target user for triggering start of a target task as the first sample speech data corresponding to the target user; and
obtaining a standard speech recognition result triggering start of the target task as the first reference speech recognition result corresponding to the first sample speech data.

9. The method according to claim 1, further comprising:
obtaining target speech data corresponding to a target user; and
inputting the target speech data into the post-update target model, to obtain a target speech recognition result.

10. The method according to claim 9, further comprising:
obtaining a receiving user corresponding to the target speech data;
obtaining extracted speech data obtained by performing extraction on the target speech data by the target speech extraction model; and
transmitting the extracted speech data and the target speech recognition result to a terminal corresponding to the receiving user, so that the terminal plays the extracted speech data and displays the target speech recognition result.

11. A computer device, comprising a memory and a processor, the memory storing computer-readable instructions, the processor being configured, when executing the computer-readable instructions, to perform:
obtaining first sample speech data corresponding to a target user and a first reference speech recognition result corresponding to the first sample speech data;
obtaining a pre-update target model, the pre-update target model comprising a target speech extraction model, a target feature extraction model, and a target speech recognition model, wherein the target feature extraction model bridges the target speech extraction model and the target speech recognition model, wherein the target speech recognition model is trained using a plurality of training audio frames each corresponding to a respective target phoneme class, and wherein at least one model parameter, of the target speech recognition model, is adjusted based on a center loss value that indicates a difference between an encoded feature, of a first training audio frame corresponding to a first target phoneme class, and a phoneme class center vector corresponding to the first target phoneme class;
inputting the first sample speech data into the pre-update target model, and performing speech recognition by using the target speech extraction model, the target feature extraction model, and the target speech recognition model, to obtain a first model output result;
obtaining a target model loss value corresponding to the target feature extraction model according to the first model output result and the first reference speech recognition result; and
updating a model parameter of the target feature extraction model in the pre-update target model according to the target model loss value, to obtain a post-update target model, and performing speech recognition on speech data of the target user by using the post-update target model.

12. The device according to claim 11, wherein the performing speech recognition by using the target speech extraction model, the target feature extraction model, and the target speech recognition model, to obtain a first model output result comprises:
inputting the first sample speech data into the target speech extraction model to perform speech extraction, to obtain first training speech data;
inputting the first training speech data into the target feature extraction model to perform feature extraction, to obtain a first training feature; and
inputting the first training feature into the target speech recognition model to perform speech recognition, to obtain the first model output result.

13. The device according to claim 12, wherein the obtaining a target model loss value corresponding to the target feature extraction model according to the first model output result and the first reference speech recognition result comprises:
obtaining a first model loss value corresponding to the target feature extraction model according to the first model output result and the first reference speech recognition result;
obtaining a second model loss value according to the first training speech data and first reference speech data corresponding to the first sample speech data; and
calculating the target model loss value corresponding to the target feature extraction model according to the first model loss value and the second model loss value.

14. The device according to claim 13, wherein the calculating the target model loss value corresponding to the target feature extraction model according to the first model loss value and the second model loss value comprises:
performing weighted summation according to the first model loss value and a corresponding first weight and the second model loss value and a corresponding second weight, to obtain the target model loss value corresponding to the target feature extraction model.

15. The device according to claim 11, wherein obtaining the pre-update target model comprises:
obtaining second sample speech data corresponding to a training user and a second reference speech recognition result corresponding to the second sample speech data, to form a training sample; and
performing joint training on a first speech extraction model, a first feature extraction model, and a first speech recognition model according to the training sample, to obtain the pre-update target model, the model parameter being updated according to a joint loss value during training, the joint loss value being determined according to a model loss value corresponding to the first speech extraction model and a model loss value corresponding to the first speech recognition model.

16. The device according to claim 15, wherein obtaining the first speech recognition model comprises:
obtaining the plurality of training audio frames; and
for each of the plurality of training audio frames:
extracting an encoded feature corresponding to the training audio frame by using an encoding model of an initial speech recognition model;
obtaining a phoneme class center vector corresponding to the target phoneme class according to the encoded feature corresponding to the training audio frame of the target phoneme class;
determining a center loss value according to a difference between the encoded feature corresponding to the training audio frame and the corresponding phoneme class center vector; and
adjusting a model parameter of the initial speech recognition model according to the center loss value.

17. The device according to claim 11, wherein the updating a model parameter of the target feature extraction model in the pre-update target model according to the target model loss value, to obtain a post-update target model comprises:
performing reverse gradient update on the model parameter of the target feature extraction model according to the target model loss value starting from the last layer of the target feature extraction model, and stopping parameter update until update reaches the first layer of the target feature extraction model, to obtain the post-update target model.

18. The device according to claim 11, wherein the obtaining first sample speech data corresponding to a target user and a first reference speech recognition result corresponding to the first sample speech data comprises:

obtaining task start speech data of the target user for triggering start of a target task as the first sample speech data corresponding to the target user; and obtaining a standard speech recognition result triggering start of the target task as the first reference speech recognition result corresponding to the first sample speech data.

19. The device according to claim 11, wherein the processor is further configured to perform:

obtaining target speech data corresponding to a target user; and inputting the target speech data into the post-update target model, to obtain a target speech recognition result.

20. One or more non-transitory storage media storing computer-readable instructions, the computer-readable instructions, when executed by one or more processors, causing the one or more processors to perform:

obtaining first sample speech data corresponding to a target user and a first reference speech recognition result corresponding to the first sample speech data;

obtaining a pre-update target model, the pre-update target model comprising a target speech extraction model, a target feature extraction model, and a target speech recognition model, wherein the target feature extraction model bridges the target speech extraction model and the target speech recognition model, wherein the target speech recognition model is trained using a plurality of training audio frames each corresponding to a respective target phoneme class, and wherein at least one model parameter, of the target speech recognition model, is adjusted based on a center loss value that indicates a difference between an encoded feature, of a first training audio frame corresponding to a first target phoneme class, and a phoneme class center vector corresponding to the first target phoneme class;

inputting the first sample speech data into the pre-update target model, and performing speech recognition by using the target speech extraction model, the target feature extraction model, and the target speech recognition model, to obtain a first model output result;

obtaining a target model loss value corresponding to the target feature extraction model according to the first model output result and the first reference speech recognition result; and updating a model parameter of the target feature extraction model in the pre-update target model according to the target model loss value, to obtain a post-update target model, and performing speech recognition on speech data of the target user by using the post-update target model.

* * * * *